United States Patent
Shooter et al.

(10) Patent No.: US 10,100,152 B2
(45) Date of Patent: *Oct. 16, 2018

(54) AROMATIC DISPERSANT COMPOSITION

(71) Applicant: Lubrizol Advanced Materials, Inc., Cleveland, OH (US)

(72) Inventors: Andrew J. Shooter, Wilmslow (GB); Dean Thetford, Norden (GB); Stuart N. Richards, Frodsham (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/378,468

(22) Filed: Dec. 14, 2016

(65) Prior Publication Data

US 2017/0088673 A1   Mar. 30, 2017

Related U.S. Application Data

(62) Division of application No. 14/397,206, filed as application No. PCT/US2013/037928 on Apr. 24, 2013, now Pat. No. 9,534,123.

(60) Provisional application No. 61/641,353, filed on May 2, 2012.

(51) Int. Cl.
| | |
|---|---|
| *C08G 73/10* | (2006.01) |
| *C09D 7/12* | (2006.01) |
| *C09D 11/102* | (2014.01) |
| *C09D 179/08* | (2006.01) |
| *C09D 7/65* | (2018.01) |
| *C08L 79/08* | (2006.01) |

(52) U.S. Cl.
CPC ......... *C08G 73/1075* (2013.01); *C09D 7/125* (2013.01); *C09D 7/65* (2018.01); *C09D 11/102* (2013.01); *C09D 179/08* (2013.01); *C08L 79/08* (2013.01)

(58) Field of Classification Search
CPC ......... C09D 11/00; C09B 5/62; C09B 67/009; C08L 79/08; C08G 73/1075
See application file for complete search history.

(56) References Cited

U.S. PATENT DOCUMENTS

| | | | |
|---|---|---|---|
| 5,688,312 A | 11/1997 | Sacripante et al. | |
| 6,440,207 B1 | 8/2002 | Schulz et al. | |
| 7,265,197 B2 | 9/2007 | Huber et al. | |
| 9,534,123 B2 * | 1/2017 | Shooter | C08G 63/664 |
| 9,540,486 B2 * | 1/2017 | Thetford | C08G 69/48 |
| 2005/0120911 A1 | 6/2005 | Huber et al. | |
| 2007/0221913 A1 | 9/2007 | Lee et al. | |

FOREIGN PATENT DOCUMENTS

| | | |
|---|---|---|
| EP | 2199312 A1 | 6/2010 |
| WO | 2007139980 A2 | 12/2007 |
| WO | 2008028954 A2 | 3/2008 |

OTHER PUBLICATIONS

Ginu, Abraham, et al: "Adhesive and Thermal Properties of Epoxy-Imide Resins Obtained from Different Diimide-Diacids: Structure-Property Correlations", International Journal of Polymeric Materials, Gordon and Breach, New York, NY, US, vol. 55, No. 2, Jan. 1, 2006, pp. 121-134, XP009095312, ISSN: 0091-4037, D01:10.1080/009140390916503.

* cited by examiner

*Primary Examiner* — Gregory Listvoyb
(74) *Attorney, Agent, or Firm* — Samuel Laferty; Teresan Gilbert

(57) ABSTRACT

The present invention relates to a polymer, and a composition containing a particulate solid, an aqueous medium, and a polymer chain having at least one fused aromatic imide pendant group. The invention further provides compositions for millbases, dispersions, coatings and inks.

19 Claims, No Drawings

AROMATIC DISPERSANT COMPOSITION

CROSS REFERENCE TO RELATED APPLICATION

This application is a Divisional Application of U.S. application Ser. No. 14/397,206 filed Oct. 27, 2014, claiming the benefit of PCT Application No. PCT/US2013/037928 filed Apr. 24, 2013, which claims the benefit of U.S. Provisional Application No. 61/641,353 filed May 2, 2012.

FIELD OF INVENTION

The present invention relates to a polymer, and a composition containing a particulate solid, an aqueous medium, and a polymer chain having at least one fused aromatic imide pendant group. The invention further provides compositions for aqueous millbases, dispersions, coatings and inks.

BACKGROUND OF THE INVENTION

Many formulations such as inks, paints and millbases require effective dispersants for uniformly distributing a particulate solid in an aqueous or polar organic medium. For inks, it is desirable for ink manufacturers to generate printed products of high resolution and quality. The adaptability of a printing process to cater for the ever widening range of base substrates, resins and pigments is a challenge. The pigment dispersion should be compatible with the different formulations used to ensure good adhesion and resistance of the final coating. Poor pigment dispersion or stabilisation can result in agglomeration or settling within the polar organic liquid medium or an aqueous liquid medium (e.g., ink or coating) lowering the gloss and aesthetic appeal.

U.S. Pat. No. 7,265,197 discloses dispersing pigments in ink compositions with a dispersant having formula:

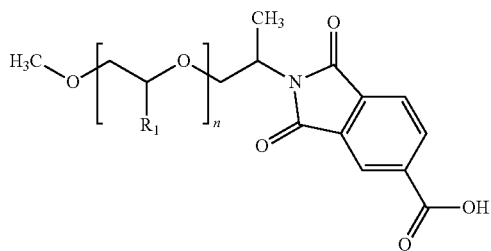

where $R_1$ is individually selected from the group consisting of H and $CH_3$, and n is an integer from 4 to 400.

International publication WO 2008/028954 discloses imide dispersant compounds containing terminal acidic groups in both a polar and a non-polar organic medium, where the dispersant compound is represented by the structure

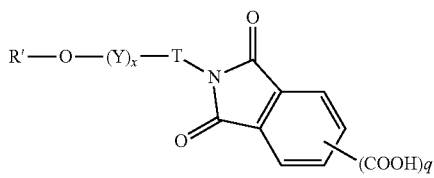

where T is $-(CH_2)_3-$ or $-CH_2CH(CH_3)-$; R' is H or $C_{1-50}$-optionally substituted hydrocarbyl group, or $C_{1-50}$-optionally substituted hydrocarbonyl; Y is $C_{2-4}$-alkyleneoxy; x is 2 to 90; and q is 1 or 2, with the proviso that in Formula (1a), when q is 1, T is $-(CH_2)_3-$, and when q is 2, T is $-(CH_2)_3-$ or $-CH_2CH(CH_3)-$ U.S. Pat. No. 5,688,312 discloses an ink composition comprised of a colorant and an imide or bisimide with a viscosity of from about 1 centipoise to 10 centipoise at a temperature of from about 125 to 180° C. The imide or bisimide may be prepared by reacting phthalic anhydride and a mono- or di-amine. The monoamine may be, for example, dodecylamine, or stearylamine. The diamine may be 1,12-dodecanediamine.

International Patent Application WO 2007/139980 discloses a reaction product of at least one di-anhydride with at least two reactants which are different from each other, each of which reactants contains a primary or secondary amino, hydroxyl or thiol functional group, and at least one of which reactants is polymeric. The reaction product is useful in compositions such as inks and coatings.

U.S. Pat. No. 6,440,207 discloses a process for preparing dispersible dry organic pigments for aqueous systems by (a) milling a mixture containing (1) one or more organic pigments, (2) at least about 1% by weight, relative to the organic pigment, of one or more aromatic polyalkylene oxide dispersants, (3) 0 to about 10 parts by weight, relative to the organic pigment, of a milling liquid in which the organic pigment is substantially insoluble, (4) 0 to about 50% by weight, relative to the organic pigment, of one or more milling additives other than dispersant (2), and (5) 0 to about 20% by weight, relative to the organic pigment, of one or more surface treatment additives; (b) optionally, adding to the milled pigment (6) one or more liquids in which the organic pigment is substantially insoluble in amounts such that the total solids content is not reduced below about 10%, and (7) one or more multivalent metal salts and/or one or more quaternary ammonium salt; and (c) isolating the milled organic pigment. The aromatic polyalkylene oxide dispersant may be prepared by reacting in an autoclave containing 250 g of deionized water 19.8 g (0.100 mol) of 1,8-naphthalic anhydride and 105 g (0.105 mol) of Jeffamine™ XTJ-506 (83 wt % ethylene oxide, 17 wt % propylene oxide). The autoclave was sealed, heated with stirring to 150° C., and maintained at 150° C. for five hours. After the reaction had cooled, the resultant brown liquid was discharged into a beaker to which was then added 15 g of decolorizing charcoal. After stirring overnight, the suspension was filtered and the filter cake washed with water, yielding approximately 500 g of an amber-colored filtrate having 23.63% solids content. The dry pigment can be employed in water-based paint systems.

SUMMARY OF THE INVENTION

One objective of the present invention is to provide compounds that are capable of at least one of improving colour strength, other tinctorial properties, increasing a particulate solid load, forming improved dispersions, having improved brightness, producing a composition with reduced viscosity, maintain stable dispersion, reduced particle size and reduced particle size distribution (typically, reduced to an average of 150 nm or less, for example, in the range of 70 to 135 nm), reduced haze, improved gloss, improved colour strength and increased jetness (especially when the composition is black). The composition of the present invention may also be stable under ambient storage, and high temperature storage conditions.

Electron withdrawing groups are well known to a person skilled in the art of organic synthesis. Examples of electron withdrawing groups include but are not limited to a halogen (such as —Cl, —Br, or —F), a nitrile, a carbonyl group, a nitro group, a sulphamoyl group, a sulphonate group, a hydroxy group or an amino group.

The electron withdrawing group may be either an activating group or a deactivating group.

The activating group may include a hydroxy group, an amino group, or a halogen. Typically, the activating group may include halogen such as —Cl.

The deactivating group may include a nitrile, a carbonyl group, a carboxyl group, a nitro group, a sulphamoyl group, or a sulphonate group. Typically, the deactivating group may include a nitro group, a carboxyl group, or a sulphonate group.

Typically, the electron withdrawing group may be a deactivating group.

In one embodiment, the invention provides a polymer comprising a polymer chain having at least one fused aromatic imide pendant group, wherein the polymer is represented by formula (1):

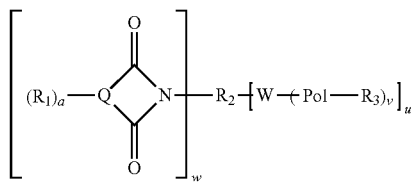

Formula (1)

wherein each variable may independently be
$R_1$ may be a substituent on Q ring in any position available for bonding to a substituent group and $R_1$ is independently represented by at least one electron withdrawing group (such as —CN, —NO$_2$, —SO$_2$NR'$_2$, —C(O)R', —SO$_3$M, —C(O)OM, halo e.g., —Cl or —Br, —NH$_2$, or —OR'). Typically, $R_1$ may be —Cl, —SO$_3$M or —NO$_2$;
a may be 1 or 2, or 1;
M may be H, a metal cation, —NR'$_4^+$, or mixtures thereof;
R' may be —H or an optionally-substituted alkyl, typically, containing 1 to 20, or 1 to 10 carbon atoms, and the substituents may be hydroxyl or halo (typically Cl) or mixtures thereof;
$R_2$ may be a $C_1$ to $C_{20}$, or $C_1$ to $C_{12}$, or $C_1$ to $C_6$ hydrocarbylene group or a $C_1$ to $C_{20}$, or $C_1$ to $C_{12}$, or $C_1$ to $C_6$ hydrocarbonylene group (when $R_2$ contains more than 2 carbon atoms, the hydrocarbylene group or hydrocarbonylene group may be linear or branched), or mixtures thereof;
$R_3$ may be H or $C_{1-50}$ (or $C_{1-20}$)-optionally substituted hydrocarbyl group that bonds to a terminal oxygen atom of the polymer chain forming a terminal ether or terminal ester group and may or may not contain a group capable of polymerization such as a vinyl group, or $C_{1-50}$ (or $C_{1-20}$)-hydrocarbonyl group (i.e., a hydrocarbyl group containing a carbonyl group) that bonds to the oxygen atom of the polymer chain forming a terminal ester group or terminal urethane group and may or may not contain a group capable of polymerization such as a vinyl group, and the substituent may be halo, ether, ester, or mixtures thereof;

Pol may be a homopolymer chain of ethylene oxide or a copolymer chain of ethylene oxide, wherein the ethylene oxide constitutes 40 wt % to 99.99 wt % of the copolymer chain;
u may be 1 to 3, or 1 to 2, or 1;
v may be 1 to 2;
w may be 1 to 3 or 1 to 2, or 1;
v=1 when W=Oxygen, Sulphur, or >NG;
G may be a hydrocarbyl group containing 1 to 200, or 1 to 100, or 1 to 30 carbon atoms;
v=2 when W=>NG; and
Q may be a fused aromatic ring containing 4n+2 π-electrons, wherein n=2 or more, typically 2 to 5, or 2 to 4, or 2 to 3, or 2), and Q is bonded to the imide group in such a way to form a 5 or 6 membered imide ring (typically 6 membered).

In one embodiment, Pol may be a copolymer of ethylene oxide and at least one member of the group consisting of an alkylene glycol containing 3 or more carbon atoms (typically 3 to 24, or 3 to 8, or 3 to 4, or 3 carbon atoms, typically, propylene oxide), styrene oxide, a lactone, a hydroxy-$C_{2-20}$-alk(en)ylene carboxylic acid, and mixtures thereof. Pol based on a copolymer of ethylene oxide and a lactone, a hydroxy-$C_{2-20}$-alk(en)ylene carboxylic acid or a mixture thereof may be defined as a copolymer of a poly(ethylene oxide) and a poly(ester) or a copolymer of poly(ether) and poly(ester).

Examples of an alkylene glycol containing 3 or more carbon atoms include propylene glycol, butylene glycol, or mixtures thereof, (typically, propylene glycol).

Examples of a hydroxy-$C_{2-20}$-alk(en)ylene carboxylic acid include ricinoleic acid, 12-hydroxy stearic acid, 6-hydroxy caproic acid, 5-hydroxy valeric acid, 12-hydroxy dodecanoic acid, 5-hydroxy dodecanoic acid, 5-hydroxy decanoic acid, 4-hydroxy decanoic acid, 10-hydroxy undecanoic acid, lactic acid glycolic acid, or mixtures thereof.

Examples of a lactone include β-propiolactone, γ-butyrolactone, optional alkyl substituted ε-caprolactone and optionally alkyl substituted δ-valerolactone. The alkyl substituent in ε-caprolactone and δ-valerolactone may be C1-6-alkyl, or C1-4-alkyl, and may be linear or branched. Examples of suitable lactones are ε-caprolactone and the 7-methyl-, 2-methyl-, 3-methyl-, 5-methyl-, 6-methyl-, 4-methyl-, 5-tertbutyl-, 4,4,6-trimethyl- and 4,6,6-trimethyl-analogues thereof.

In one embodiment, the polymer of the present invention (typically represented by formula (1)) may be obtained/obtainable by a process comprising reacting an amine ended polymer with a fused aromatic di-acid or anhydride or other acid-forming derivative (such as di-ester, di-amide, di-acid dichloride) to form a fused aromatic imide with a polymer chain. The reaction to form the imide may be carried out at a sufficiently high temperature known to the skilled person to favour imide formation e.g., at least 100° C., or 150° C. to 200° C.

In one embodiment, the polymer of the present invention (typically represented by formula (1)) may be obtained/obtainable by a process comprising:

Step (1): reacting (i) amino acid or (ii) an aminoalcohol, or (iii) an aminothiol, or (iv) a diamine or polyamine, with a fused aromatic di-acid or anhydride or other acid-forming derivative (such as di-ester, di-amide, di-acid dichloride) to form an acid-functionalised fused aromatic imide or a hydroxyl-functionalised fused aromatic imide, or a thiol-functionalised fused aromatic imide, or an amino-functionalised fused aromatic imide respectively. The first step of the reaction (to form the imide) may be carried out at a sufficiently high temperature known to the skilled person to favour imide formation e.g., at least 100° C., or 150° C. to 200° C.;

Step (2): reacting the acid-functionalised fused aromatic imide or the hydroxyl-functionalised fused aromatic imide, or the thiol-functionalised fused aromatic imide, or the amino-functionalised fused aromatic imide with a polymer chain, or monomers that polymerise to form the polymer chain, wherein the polymer chain is a homopolymer chain of ethylene oxide or a copolymer chain of ethylene oxide, and wherein the ethylene oxide constitutes 40 wt % to 99.99 wt % of the copolymer chain.

The product of Step (1) may be used as a polymerization terminating agent if the polymer chain has been pre-formed before reaction in Step (2).

The product of Step (1) may be used as a polymerization initiator if the polymer chain is grown from one or more monomers in Step (2).

When the product of Step (1) is further reacted in an alkoxylation reaction, the reaction temperature may be 100° C. to 200° C. in the presence of a base catalyst such as potassium hydroxide or sodium hydroxide.

When the product of Step (1) or Step (2) is further reacted in an esterification reaction, the reaction temperature may be 50° C. to 250° C. or 150° C. to 200° C., optionally in the presence of an esterification catalyst.

The esterification catalyst may be any previously known to the art and include tin(II) octanoate, tetra-alkyl titanate, for example, tetrabutyltitanate, zinc salt of an organic acid, for example, zinc acetate, zirconium salt of an aliphatic alcohol, for example, zirconium isopropoxide, toluene sulphonic acid or a strong organic acid such as trifluoroacetic acid, or phosphoric acid.

The polymer of formula (1) may be capped with an $R_3$ group (other than H). The $R_3$ group may be derived from a carboxylic acid, an acid derivative, an alcohol or an isocyanate. The acid, acid derivative, alcohol and isocyanate are described herein below. The reaction conditions for capping the polymer chain to result in the polymer of the present invention with an acid, an acid derivative, an alcohol or an isocyanate are reactions known in the art.

The process may be carried out in an inert atmosphere provided by any inert gas of the Periodic Table but typically nitrogen. The process may be carried out in a melt, or in the presence or absence of solvent. The solvent may be a non-polar solvent (such as an aromatic or aliphatic compound), a polar organic solvent or water. The solvents are well known in the art.

In one embodiment, the invention provides a composition comprising a particulate solid, an aqueous medium, and a polymer chain having at least one fused aromatic imide pendant group, wherein the polymer is represented by formula (1) defined above. The composition may be a millbase, paint or ink.

In one embodiment, the invention provides a composition comprising a particulate solid, a polar organic medium, and a polymer chain having at least one fused aromatic imide pendant group, wherein the polymer is represented by formula (1) defined above. The composition may be a millbase, paint or ink.

In one embodiment, the invention provides a composition comprising a particulate solid, an aqueous medium, and a polymer chain having at least one fused aromatic imide pendant group, wherein the polymer is represented by formula (1) defined above further comprises a binder. In one embodiment, the binder may be polyepoxide, polyurethane, polyamide, poly(meth)acrylate, polyester, cellulose or alkyd.

In one embodiment, the invention provides a composition comprising a particulate solid, a polar organic medium, and a polymer chain having at least one fused aromatic imide pendant group, wherein the polymer is represented by formula (1) defined above further comprises a binder. In one embodiment, the binder may be cellulose (such as nitrocellulose), polyurethane, poly(meth)acrylate, polyester, or polyamide.

The present invention also provides a composition comprising a particulate solid (typically, a pigment or filler), an aqueous medium and a polymer chain having at least one fused aromatic imide pendant group, wherein the polymer is represented by formula (1) defined above. The composition may be a millbase, paint or ink.

The present invention also provides a composition comprising a particulate solid (typically, a pigment or filler), a polar organic medium and a polymer chain having at least one fused aromatic imide pendant group, wherein the polymer is represented by formula (1) defined above. The composition may be a millbase, paint or ink.

The particulate solid disclosed herein in a composition of the present invention may be a pigment or a filler. The pigment may, in one embodiment, be an organic pigment.

In one embodiment, the invention provides a paint or ink comprising a particulate solid, an aqueous medium, a film-forming resin and a polymer of the invention disclosed herein.

In one embodiment, the invention provides a paint or ink comprising a particulate solid, a polar organic medium, a film-forming resin and a polymer of the invention disclosed herein.

The ink may be an ink-jet ink, a flexo ink, offset ink or a gravure ink. The ink may be a radiation curable ink.

In one embodiment, the compositions disclosed herein further include a binder.

In one embodiment, the invention provides for a composition comprising a polymer chain having at least one fused aromatic imide pendant group, wherein the polymer is represented by formula (1) defined above, an organic pigment and a binder. The binder may be selected from the group consisting of cellulose, polyacrylic, polyester, polyether, polyurethane, alkyds and polyamide. The composition may be used in an ink for a printing process, such as a flexographic printing process or ink jet inks such as radiation curable, non impact and drop on demand.

The polymer of the present invention may be present in a composition disclosed herein in an amount ranging from 0.1 wt % to 79.6 wt %, or 0.5 wt % to 30 wt %, or 1 wt % to 25 wt % of the composition.

In one embodiment, the invention provides for the use of the polymer having at least one fused aromatic imide pendant group, wherein the polymer is represented by formula (1) defined above as a dispersant in a composition disclosed herein.

In one embodiment, the invention provides for the use of a polymer having at least one fused aromatic imide pendant group, wherein the polymer is represented by formula (1) defined above as a dispersant in an ink composition. The ink composition may have at least one of reduced particle size and reduced particle size distribution (typically reduced to an average of 150 nm or less), reduced haze, improved gloss, increased jetness (especially when the composition is black) and be stable under ambient storage, and high temperature storage conditions.

Without being bound by theory, it is believed that the fused aromatic imide pendant group may act as an anchor group between the polymer of invention and a particulate solid such as a pigment.

DETAILED DESCRIPTION OF THE INVENTION

The present invention provides a composition and use disclosed herein above.

The polymer chain (Pol) may have number average molecular weight of 100 to 10,000, or 100 to 5000, or 300 to 3000, or 400 to 2500.

The number average molecular weight may be determined for a pre-prepared polymer chain by GPC analysis. The number average molecular weight of a polymer that is prepared in-situ i.e., the polymer chain is grown off the imide group may be calculated by determining the degree of polymerisation (DP) which is proportional to the ratio of monomer [M] and initiator [I] (the initiator being the fused aromatic anhydride derived intermediate), and calculated by the formula DP=[M]/[I]. Analysis using nuclear magnetic resonance (NMR) can be used to determine the degree of polymerization and thus to calculate number average molecular weight of the polymeric group or polymer segment of the molecule.

Examples of a hydrocarbylene group defined by $R^2$ may include methylene, ethylene, propylene, butylene, pentylene, hexylene, octylene, decylene, dodecylene or their branched isomers. In one embodiment, hydrocarbylene group defined by $R^2$ may be $(-CH_2-)_3$ or $-CH_2CH(CH_3)-$ or $-CH_2CH_2-$.

$R^2$ may be derived from an aminoalcohol, an aminothiol, an aminocarboxylic acid, or an amine having 1 to 3, or 1 to 2, or 1 $-NH_2$ group. The amine may or may not contain additional alkyl groups.

Examples of a diamine include 1,2-diaminoethane, propane-1,3-diamine, butane-1,4-diamine, pentane-1,5-diamine, or hexane-1,6-diamine, dodecane-1,12-diamine, or mixtures thereof.

Examples of polyamines to include N-(2-aminoethyl)-1,3-propane diamine, 3,3'iminobispropylamine, spermidine, bis(hexamethylene)triamine, triethylene triamine, N,N'-bis(3-aminopropyl)-1,3-ethylenediamine, N,N'-bis(2-aminoethyl)-1,3-propanediamine, spermine, tris(2-aminoethyl) amine, tetraethylenepentamine, triethylene tetramine, or diethylene triamine, or mixtures thereof.

The aminoalcohol may be a $C_{2-20}$-aminoalcohol and may or may not contain more than one hydroxyl group and may or may not contain more than one amino group. The aminoalcohol may be ethanolamine, 3-amino-1-propanol, 4-aminobutanol, 2-aminobutanol, 2-amino-2-methyl-1-propanol, 5-amino-1-pentanol, 5-amino-2-pentanol, 2-amino-3-methyl-1-butanol, 6-amino-1-hexanol, 2-amino-1-hexanol, serinol, 4-amino cyclohexanol, 2-(2-aminoethoxy)ethanol, 3-amino-1,2-propanediol, 2-amino-2-ethyl-1,3-propanediol, tris-(hydroxymethyl)amino methane, tris-(hydroxypropyl) amino methane, 1,3-diamino-2-hydroxy propane, or mixtures thereof.

The amino thiol may be a $C_{2-20}$-aminothiol and may or may not contain more than one thiol group or may or may not contain more than one amino group. The aminothiol may be 2-aminoethanethiol, 3-aminopropane-1-thiol, 4-aminobutane-1-thiol, 5-aminopentane-1-thiol, 6-aminohexane-1-thiol or mixtures thereof.

As used herein the term "hydrocarbonylene group" is a hydrocarbylene group containing a carbonyl group. Typically, a hydrocarbonylene group may include $-(CH_2)_5-C(O)-$, $-(CH_2)_4-C(O)-$, $-(CH_2)_3-C(O)-$, or $-(CH_2)_2-C(O)-$.

The aminocarboxylic acid (or amino-acid) may be an amino-$C_{2-20}$-alk(en)ylene carboxylic acid and may or may not contain more than one carboxylic acid group and may or may not contain more than one amino group. The aminocarboxylic acid may or may not contain other groups containing heteroatoms such as hydroxyl or thiol groups. The alk(en)ylene group may be linear or branched. The alk(en)ylene group of the amino carboxylic acid contains not greater than 12 carbon atoms. Specific examples include 11-amino undecanoic acid, 12-amino dodecanoic acid, 6-amino caproic acid, 4-aminobutyric acid, aspartic acid, glutamic acid, lysine, asparagine, glutamine, threonine, serine, cysteine, β-alanine, glycine, and sarcosine. Mixtures of amino carboxylic acids may be used.

As used herein reference to hydrocarbylene or hydrocarbonylene groups may be linear or branched, and saturated or unsaturated.

The technical feature defined within Q of 4n+2 π-electrons is well known to a skilled person as Hückel's rule. Typically, n may be equal to 2 (i.e., the number of π-electrons is 10), or 3 (i.e., the number of π-electrons is 14). In one embodiment, n may be equal to 2.

Q may be based on a naphthalene, an anthracene, a phenanthrene, or mixtures thereof. In one embodiment, Q may be based on a naphthalene.

When Q is based on naphthalene, the polymer chain of formula (1) may have a naphthalene imide group such as a 1,2-naphthalene imide, 2,3-naphthalene imide, or a 1,8-naphthalene imide group, or mixtures thereof.

When Q is based on anthracene, the polymer chain of formula (1) may have a 1,2-anthracene imide, 2,3-anthracene imide, or a 1,9-anthracene imide group, or mixtures thereof.

When Q is based on phenanthrene, the polymer chain of formula (1) may have a 2,3-phenanthrene imide, or a 8,9-phenanthrene imide group, or mixtures thereof.

Typically, Q is based on 1,8-naphthalene anhydride, or 1,2-naphthalene anhydride, or mixtures thereof.

Q may be based on a naphthalene anhydride such as 4-nitro-1,8-naphthalic imide or 3-nitro-1,8-naphthalic imide (when one $R_1=NO_2$), 4-chloro-1,8-naphthalic imide (when one $R_1=Cl$) group, 4-sulpho-1,8-naphthalic imide or 3-sulpho-1,8-naphthalic imide (when one $R_1=SO_3H$), or mixtures thereof.

$R_1$ may be electron-withdrawing (such as $-NO_2$ group, or a halo group, typically $-Cl$), or mixtures thereof. When $R_1$ is electron-withdrawing, the $R_1$ may be either meta-substituted or para-substituted relative to the imide group or mixtures thereof. In one embodiment, the $R_1$ may be meta-substituted relative to the imide group. During the preparation of the polymer chain of the invention, the fused aromatic imide may have substitution at position 3- and/or 4- on Q (typically a 1,8-naphthalic imide).

R' may be an alkyl or optionally-substituted alkyl having an alkyl group that is linear or branched.

The alkyl groups defined by R' include methyl, ethyl, propyl, butyl, pentyl, hexyl, heptyl, 2-ethylhexyl, nonyl, decyl, undecyl, dodecyl, tridecyl, tetradecyl, pentadecyl, hexadecyl, heptadecyl, octadecyl, nonadecyl, eicosyl, or mixtures thereof. In one embodiment, R' may be derived from an alkanol.

$R_3$ may be H or $C_{1-50}$ (or $C_{1-20}$)-optionally substituted hydrocarbyl group that bonds to a terminal oxygen atom of the polymer chain forming a terminal ether or terminal ester group and may or may not contain a group capable of polymerization such as a vinyl group, or $C_{1-50}$ (or $C_{1-20}$)-hydrocarbonyl group (i.e., a hydrocarbyl group containing a carbonyl group) that bonds to the oxygen atom of the polymer chain forming a terminal ester group or terminal urethane group and may or may not contain a group capable of polymerization such as a vinyl group, and the substituent may be halo, ether, ester, or mixtures thereof.

$R_3$ may comprise groups such as (meth)acrylate, styryl, vinyl ether or allyl ether and mixtures thereof. Examples of $R_3$ may be derived from (meth)acrylic acid and their esters, hydroxyl alkyl (meth)acrylates and their polyether derivatives such as hydroxyethyl acrylate or polyethyleneglycol monoacrylate, isocyanato(meth)acrylates for example isocyanatoethylmethacrylate $R_3$ may be derived from an alcohol, a carboxylic acid or acid derivative such as an acid halide, or an isocyanate or mixtures thereof.

As used herein the term "alk(en)ylene" is intended to include alkylene and alkenylene groups.

The alcohol may be a $C_{1-20}$ alk(en)ylene alcohol, the alk(en)ylene alcohol group may be linear or branched. Specific examples of alcohols are methanol, ethanol, n-propanol, isopropanol, n-butanol, 1-methyl-propanol, 2-methylpropanol, tert-butanol, n-pentanol, 1-methylbutanol, 2-methylbutanol, 3-methylbutanol, 2,2-dimethylpropanol, n-hexanol, 1-methylpentanol, 2-methylpentanol, 3-methylpentanol, 4-methylpentanol, 1,1-dimethylbutanol, 2,2-dimethylbutanol, 3,3-dimethyl-butanol, 1,2-dimethylbutanol, n-heptanol, 1-methyl-hexanol, 2-methylhexanol, 3-methylhexanol, 4-methyl-hexanol, 1,2-dimethylpentanol, 1,3-dimethylpentanol, 1,1-dimethylpentanol, 1,1,2,2-tetramethylpropanol, benzyl alcohol, n-octanol, 2-ethylhexanol, n-nonanol, 1-methyloctanol, 2-methyloctanol, n-decanol, n-undecanol, 1-methyldecanol, 2-methyldecanol, n-dodecanol, 2,4-diethyloctanol and the so-called Guerbet alcohols such as those which are commercially available under the trade name Isofol (ex Condea GmbH), or mixtures thereof. Specific examples of Guerbet alcohols are Isofol 12, 14T, 16, 18T, 18E, 20, 24, 28, 32, 32T and 36.

The carboxylic acid may be a $C_{1-20}$ alk(en)ylene carboxylic acid, the alk(en)ylene carboxylic acid group may be linear or branched. Specific examples of carboxylic acids are acetic acid, methoxyacetic acid, propionic acid, isobutyric acid, 2-methylbutyric acid, isovaleric acid, valeric acid, isocaproic acid, caproic acid, heptanoic acid, octanoic acid, 2-ethylhexanoic acid, decanoic acid, dodecanoic acid, tetradecanoic acid, hexadecanoic acid, octadecanoic acid, eicosanoic acid or mixtures thereof.

The isocyanate may be an aromatic or $C_{2-20}$ alk(en)ylene isocyanate, the alk(en)ylene isocyanate group may be linear or branched. Specific examples are 1-isocyanatorethane, 1-isocyanatopropane, 1-isocyanatobutane, 2-isocyanatobutane, 1-isocyanatopentane 1-isocyanatohexane, 1-isocyanatoheptane, 3-(isocyanatomethyl)heptane, 2-isocyanatoheptane 2-isocyanato-2,4,4-trimethylpentane 1-isocyanatooctane, 2-isocyanatooctane, 1-isocyanatononane, 2-isocyanatononane 1-isocyanatododecane, 1-isocyanatotetradecane, 1-isocyanatoundecane, 1-isocyanatooctadecane, 1-isocyanatopentadecane, 1-isocyanatohexadecane, isocyanatocycloheptane, isocyanatocyclooctane, (isocyanatomethyl)cyclohexane, socyanatocyclododecane, isocyanatocyclopentane, isocyanatocyclohexane. 1-ethyl-4-(2-isocyanatoethyl)benzene, 1-isocyanato-4-methylbenzene, 1-tert-butyl-4-isocyanatobenzene, 4-isocyanato-1,2-dimethylbenzene, 1-isocyanato-2,4-dimethylbenzene, 2-isocyanato-1,3,5-trimethylbenzene, 1-ethyl-4-isocyanatobenzene, 1-isocyanato-4-isopropylbenzene, or mixtures thereof.

The acid halide may be a $C_{1-20}$ alk(en)ylene acid chloride, the alk(en)ylene acid chloride group may be linear or branched. Specific examples of acid chlorides are methanoyl chloride, butanoyl chloride 3,3-dimethylbutanoyl chloride, 3-methylbutanoyl chloride, 2-methylbutanoyl chloride, pentanoyl chloride, heptanoyl chloride, hexanoyl chloride, 2-ethylbutanoyl chloride, decanoyl chloride, 2-ethylhexanoyl chloride, octanoyl chloride, 2-methylpentanoyl chloride, 3,5,5-trimethylhexanoyl chloride, nonanoyl chloride or mixtures thereof.

In one embodiment, $R_3$ may comprise a group capable of polymerization such as a vinyl group. $R_3$ may comprise groups such as (meth)acrylate, styryl, vinyl ether or allyl ether and mixtures thereof. Examples of $R_3$ may be derived from (meth)acrylic acid and their esters, hydroxyl alkyl (meth)acrylates and their polyether derivatives such as hydroxyethyl acrylate or polyethyleneglycol monoacrylate, isocyanato(meth)acrylates for example isocyanatoethylmethacrylate or isocyanatostyryl derivatives such as 4-isopropenyl-alpha,alpha-dimethylbenzyl isocyanate or mixtures thereof.

W may be oxygen, sulphur, >NH or >NG, wherein G represents a hydrocarbyl group containing 1 to 200, or 1 to 100, or 1 to 30 carbon atoms. Typically, W may be oxygen, sulphur or nitrogen. When W is sulphur, the structural group represented by the aromatic ring-$R_2$—W may be formed by reacting an anhydride of the aromatic ring with an aminothiol. When W is oxygen, the structural group represented by the aromatic ring-$R_2$—W may be formed by reacting an anhydride of the aromatic ring with either an aminoalcohol, or an aminocarboxylic acid. When W is >NH (or >NG), the structural group represented by the aromatic ring-$R_2$—W may be formed by reacting an anhydride of the aromatic ring with either a diamine or a polyamine.

Mixtures of all of these can be used i.e., the structural group represented by the aromatic ring-$R_2$—W may be formed by reacting an anhydride of the aromatic ring with a mixture of two, or three, or four, or all five of an aminoalcohol, or an aminocarboxylic acid, an aminothiol, a diamine, or a polyamine. The aromatic ring-$R_2$—W may be formed in a one-pot reaction in the presence of all reactants. Alternatively, a blend of the aromatic ring-$R_2$—W group may be formed by mixing the individual pre-prepared imides.

The cation M, may be a mono- or di-, or tri-valent metal. The metal cation may for instance be an alkali metal, or alkaline earth metal, or a transition metal. The metal cation may include lithium, sodium, potassium, calcium, magnesium, barium, zinc, or mixtures thereof.

The polymer chain Pol may be a homopolymer. The polymer chain Pol may be a copolymer. When Pol is a copolymer, the polymer chain may have random or block architecture. The polymer chain may have random architecture. The polymer chain may have block architecture.

In one embodiment, the polymer chain (Pol) is based on a poly(ether). The poly(ether) may be based on a polyethylene oxide homopolymer or a mixture of polyethylene oxide and a polyalkylene glycol (typically, a poly($C_3$-$C_4$-alkylene glycol or a polyalkarylene glycol (typically, a poly $C_8$-glycol such as poly styrene oxide)). In one embodiment, the poly(ether) polymer chain may be incorporated into an imide structure represented by Formula (2):

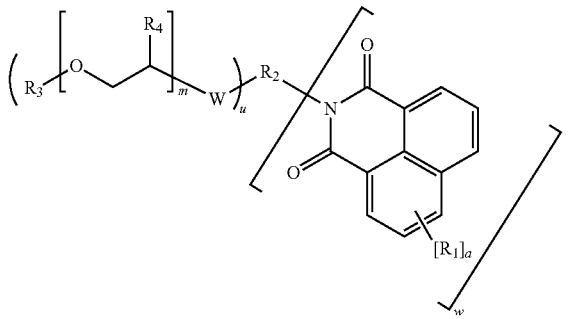

Formula (2)

wherein each variable may independently be $R_1$ may be a substituent on Q ring in any position available for bonding to a substituent group and $R_1$ is independently represented by at least one electron withdrawing group (such as —CN, —NO$_2$, —SO$_2$NR'$_2$, —C(O)R', —SO$_3$M, —C(O)OM, halo e.g., —Cl or —Br, —NH$_2$, or —OR'), typically, $R_1$ may be —Cl, —SO$_3$M or —NO$_2$;

a may be 1 or 2, or 1;

W may be oxygen;

M may be H, a metal cation, —NR'$_4^+$, or mixtures thereof;

R' may be —H, or an optionally-substituted alkyl, typically containing 1 to 20, or 1 to 10 carbon atoms, and the substituents may be hydroxyl or halo (typically Cl) or mixtures thereof;

$R_2$ may be a $C_1$ to $C_{20}$, or $C_1$ to $C_{12}$, or $C_1$ to $C_6$ hydrocarbylene group or a $C_1$ to $C_{20}$, or $C_1$ to $C_{12}$, or $C_1$ to $C_6$ hydrocarbonylene group (when $R_2$ contains more than 2 carbon atoms, the hydrocarbylene group or hydrocarbonylene group may be linear or branched), or mixtures thereof;

$R_3$ may be H or $C_{1-50}$ (or $C_{1-20}$)-optionally substituted hydrocarbyl group that bonds to a terminal oxygen atom of the polymer chain forming a terminal ether or terminal ester group and may or may not contain a group capable of polymerization such as a vinyl group, or $C_{1-50}$ (or $C_{1-20}$)-hydrocarbonyl group (i.e., a hydrocarbyl group containing a carbonyl group) that bonds to the oxygen atom of the polymer chain forming a terminal ester group or terminal urethane group and may or may not contain a group capable of polymerization such as a vinyl group, and the substituent may be halo, ether, ester, or mixtures thereof.

$R_4$ may be H when Pol is a homopolymer, and $R_4$ may be a mixture of H (in an amount sufficient to provide ethylene oxide groups at 40 wt % to 99.99 wt %) and at least one of methyl, ethyl and phenyl, when Pol is a copolymer;

u may be 1 to 3, or 1 to 2, or 1;

w may be 1 to 3, or 1 to 2, or 1;

with the proviso that when $R_2$ is a hydrocarbylene group, u is 1 and w is 1;

and m may be 1 to 110, or 1 to 90 or 2 to 90.

In Formula (2), the integer m is such that the polymer chain may have number average molecular weight of 100 to 10,000, 100 to 5000, or 300 to 3000, or 400 to 2500.

An imide of Formula (2) may be prepared by two different processes. The polymer chain of Formula (2) may be referred to as a polyether.

The polyether may contain 0 to 60 wt %, 0 to 50 wt %, 0 to 30 wt %, or 0 to 20 wt %, or 0 to 15 wt % of an alkylene oxide having 3 or more (typically 3 or 4, or 3) carbon atoms.

The polyether may contain 40 to 100 wt %, 50 to 100 wt %, 70 to 100 wt %, or 80 to 100 wt %, or 85 to 100 wt % of ethylene oxide.

The polyether may, for example, be a copolymer of ethylene oxide and propylene oxide. The polyether may be derived from:

0 to 60 wt % propylene oxide, and 40 to 100 wt % ethylene oxide, or 0 to 50 wt % propylene oxide, and 50 to 100 wt % ethylene oxide, or 0 to 30 wt % propylene oxide, and 70 to 100 wt % ethylene oxide, or 0 to 20 wt % propylene oxide, and 80 to 100 wt % ethylene oxide, or 0 to 15 wt % propylene oxide, and 85 to 100 wt % ethylene oxide.

For example, the polyether may contain 8 wt % propylene oxide, and 92 wt % ethylene oxide, or 14 wt % propylene oxide, and 86 wt % ethylene oxide, or 29 wt % propylene oxide, and 71 wt % ethylene oxide.

In one embodiment, the polymer chain may be a Poly (ether) of either (i) a polyethylene oxide homopolymer, or (ii) a copolymer of ethylene oxide and propylene oxide.

The first process comprises reacting a polyether amine (typically, a polyalkyleneoxide monoalkyl ether monoamine) with a fused aromatic di-acid or anhydride to form the product of Formula (2).

The polyetheramine may be prepared by reacting a monoalcohol initiator with ethylene oxide only or with a mixture of ethylene oxide and propylene oxide to form an alcohol-ended polymer chain, followed by conversion of the alcohol-ended polymer chain to an amine. The polyether amine may be commercially available as the Surfonamine® amines from Huntsman Corporation. Specific examples of Surfonamine® amines are L-100 (propylene oxide to ethylene oxide mix ratio of 3/19), and L-207 (propylene oxide to ethylene oxide mix ratio of 10/32), L-200 (propylene oxide to ethylene oxide mix ratio of 3/41), and L-300 (propylene oxide to ethylene oxide mix ratio of 8/58). The figures in parentheses are approximate repeat units of propylene oxide, and ethylene oxide respectively. The polyetheramine may be obtained by alkoxylation of aminoalcohols as is described in U.S. Pat. No. 5,879,445 (in particular the disclosure in column 2, line 50 to column 7, line 50).

The second process comprises reacting an amino-acid with a fused aromatic di-acid or anhydride to form an acid-functionalised imide; and esterifying acid-functionalised imide with a polyalkylene glycol mono-substituted $C_{1-20}$ alk(en)ylene ether.

The polyalkylene glycol mono-substituted $C_{1-20}$ alk(en)ylene ether may be a homopolymer containing ethylene glycol or a random or block copolymer, typically containing at least one of propylene glycol, butylene glycol, and ethyl benzene glycol copolymerized with ethylene glycol.

The polyalkylene glycol mono-substituted $C_{1-20}$ alk(en)ylene ether may be methoxy polyethylene glycol, ethoxy polyethylene glycol, propoxy polyethylene glycol, butoxy polyethylene glycol, polyethylene glycol monoacrylate, alkoxy(polyethylene glycol-co-polypropylene glycol) or mixtures thereof.

In one embodiment, the polymer chain (Pol) is based on a poly(ether). The poly(ether) may be based on a polyalkylene glycol (typically, a poly($C_2$-$C_4$-alkylene glycol). In one embodiment, the poly(ether) polymer chain may be incorporated into an imide structure represented by Formula (3a):

Formula (3a)

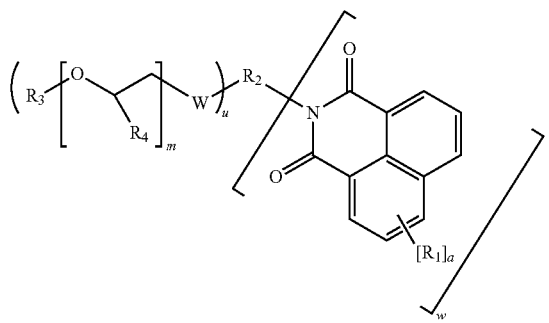

(ether) polymer chain may be incorporated into an imide structure represented by Formula (3b):

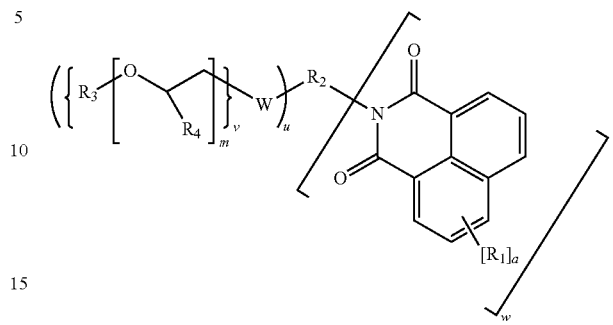

wherein
W is N (formed when $R^2$ of formula (1) is derived from a diamine or a polyamine);
$R_2$ may be a $C_1$ to $C_{20}$, or $C_1$ to $C_{12}$, or $C_1$ to $C_6$ hydrocarbylene group;
v is 2;
and wherein all other variables are defined above.

In Formula (3a) and (3b), the integer m is such that the polymer chain may have number average molecular weight of 100 to 10,000, or 100 to 5000, or 300 to 3000, or 400 to 2500.

An imide of Formula (3a) and (3b) may be prepared by different processes. The polymer chain of Formula (3a) and (3b) may be referred to as a polyether.

Formula (3a) may be prepared by a process that comprises reacting an aminoalcohol with a fused aromatic di-acid or anhydride to form a hydroxyl-functionalised fused aromatic imide, and then reacting the hydroxyl-functionalised fused aromatic imide with at least one oxirane (such as ethylene oxide or a mixture of ethylene oxide with propylene oxide, butylene oxide, styrene oxide or mixtures thereof), or a carbonate (such as ethylene carbonate, or propylene carbonate) to form the polymer of the invention of Formula (3a) where $R_3$ is —H. The first step of the reaction (to form the imide) may be carried out at a sufficiently high temperature known to the skilled person to favour imide formation e.g., at least 100° C., or 150° C. to 200° C., or at least 100° C., or 150° C. to 250° C. The second step of the reaction to react the imide with at least one oxirane to form the product of Formula (3a) is carried out at a sufficiently high temperature known to the skilled person, e.g., at least 100° C., or 150° C. to 200° C. in the presence of a base catalyst. Typically, a temperature in the range of 150° C. to 250° C. may be employed when a carbonate is used.

Formula (3a) may be prepared by a process that comprises reacting an aminothiol with a fused aromatic di-acid or anhydride to form a thiol-functionalised fused aromatic imide, and then reacting the thiol-functionalised fused aromatic imide with at least one oxirane (such as ethylene oxide alone or in combination with propylene oxide, butylene oxide, or styrene oxide or mixtures thereof) or a carbonate (such as ethylene carbonate, or propylene carbonate) to form the polymer of the invention of Formula (3a) where $R_3$ is —H, using the process conditions stated above.

wherein each variable may independently be
$R_1$ may be a substituent on Q ring in any position available for bonding to a substituent group and $R_1$ is independently represented by at least one electron withdrawing group (such as —CN, —$NO_2$, —$SO_2NR'_2$, —C(O)R', —$SO_3M$, —C(O)OM, halo e.g., —Cl or —Br, —$NH_2$, or —OR'), typically $R_1$ may be —Cl, —$SO_3M$ or —$NO_2$;
a may be 1 or 2, or 1;
W may be sulphur, >NH, >NG, or oxygen, or mixtures thereof (typically, oxygen or >NG);
M may be H, a metal cation, —$NR'_4{}^+$, or mixtures thereof;
R' may independently be —H, or an optionally-substituted alkyl, typically, containing 1 to 20, or 1 to 10 carbon atoms, and the substituents may be hydroxyl or halo (typically Cl), or mixtures thereof;
$R_2$ may be a $C_1$ to $C_{20}$, or $C_1$ to $C_{12}$, or $C_1$ to $C_6$ hydrocarbylene group or a $C_1$ to $C_{20}$, or $C_1$ to $C_{12}$, or $C_1$ to $C_6$ hydrocarbonylene group (when $R_2$ contains more than 2 carbon atoms, the hydrocarbylene group or hydrocarbonylene group may be linear or branched), or mixtures thereof;
G may be a hydrocarbyl group containing 1 to 200, or 1 to 100, or 1 to 30 carbon atoms;
$R_3$ may be H or $C_{1-50}$ (or $C_{1-20}$)-optionally substituted hydrocarbyl group that bonds to a terminal oxygen atom of the polymer chain forming a terminal ether or terminal ester group and may or may not contain a group capable of polymerization such as a vinyl group, or $C_{1-50}$ (or $C_{1-20}$)-hydrocarbonyl group (i.e., a hydrocarbyl group containing a carbonyl group) that bonds to the oxygen atom of the polymer chain forming a terminal ester group or terminal urethane group and may or may not contain a group capable of polymerization such as a vinyl group, and the substituent may be halo, ether, ester, or mixtures thereof;
$R_4$ may be H when Pol is a homopolymer, and $R_4$ may be a mixture of H (in an amount sufficient to provide ethylene oxide groups at 40 wt % to 99.99 wt %) and at least one of methyl, ethyl and phenyl, when Pol is a copolymer;
u may be 1 to 3, or 1 to 2, or 1;
w may be 1 to 3, or 1 to 2, or 1; and
m may be 1 to 110, or 1 to 90 or 2 to 90.

The polymer of the invention may have multiple polymer chain types attached to the group W. In one embodiment, the polymer chain (Pol) is based on a poly(ether). The poly(ether) may be based on a polyalkylene glycol (typically, a poly($C_2$-$C_4$-alkylene glycol). In one embodiment, the poly Formula (3a) may also be prepared by a process that comprises reacting an amino acid with a fused aromatic di-acid or anhydride to form an acid-functionalised fused aromatic imide, and then reacting the acid-functionalised fused aromatic imide with at least one oxirane (such as ethylene oxide alone or in combination with propylene oxide, butylene oxide, or styrene oxide or mixtures thereof) or a carbonate (such as ethylene carbonate, or propylene carbonate) to form the polymer of the invention of Formula (3a) where $R_3$ is —H, using the process conditions stated above.

Formula (3a) and (3b) may be prepared by a process that comprises reacting a diamine with a fused aromatic di-acid or anhydride to form an amino-functionalised fused aromatic imide and then reacting the amino-functionalised fused aromatic imide with at least one oxirane (such as ethylene oxide alone or in combination with propylene oxide, butylene oxide, or styrene oxide or mixtures thereof) or a carbonate (such as ethylene carbonate or propylene carbonate) to form the polymer of the invention of Formula (3a) where $R_3$ is —H, using the process conditions stated above.

The reaction of the hydroxyl-functionalised fused aromatic imide or thiol-functionalised fused aromatic imide or acid-functionalised fused aromatic imide or amino-functionalised fused aromatic imide, with the oxirane in the processes described above may be carried out at a temperature of 100° C. to 200° C. in the presence of a base such as potassium hydroxide or sodium hydroxide.

In one embodiment, the poly(ether) polymer chain of the imide structure represented by Formula (3a) and (3b) where $R_3$ is a —H, may be capped by a $C_{1-50}$ (or $C_{1-20}$)-hydrocarbonyl group (i.e., a hydrocarbyl group containing a carbonyl group). $R_3$ may be obtained/obtainable from a carboxylic acid, an acid derivative such as an acid halide, an isocyanate or mixtures thereof. The reaction conditions for capping the polymer chain to form the polymer of Formula (3a) and (3b) where $R_3$ may be a a $C_{1-50}$ (or $C_{1-20}$)-hydrocarbonyl group (i.e., a hydrocarbyl group containing a carbonyl group), are reactions known in the art.

In Formula (2) and (3), an aqueous medium dispersant may be formed when the polyether contains at least 60 wt % to 100 wt % ethylene oxide In Formula (2) and (3), a polar organic medium dispersant may be formed when the polyether contains at least 40 wt % to 60 wt % ethylene oxide.

Typically, for an aqueous medium dispersant the polymer of Formula (2) and (3) contains 60 wt % to 100 wt %, 70 wt % to 100 wt %, or 80 wt % to 100 wt %, or 100 wt % ethylene oxide; and 0 wt % to 40 wt %, or 0 wt % to 30 wt %, or 0 wt % to 20 wt %, or 0 wt % propylene oxide.

In one embodiment, the polymer chain (Pol) is based on a poly(ether) co-poly(ester). The poly(ether) co-poly(ester) may be based on a polyalkylene glycol (typically a poly($C_2$-$C_4$-alkylene glycol) and a lactone, or a hydroxy-$C_{2-20}$-alk(en)ylene carboxylic acid or mixtures thereof. In one embodiment, the poly(ether) co-poly(ester) polymer chain may be incorporated into an imide structure represented by Formula (4a):

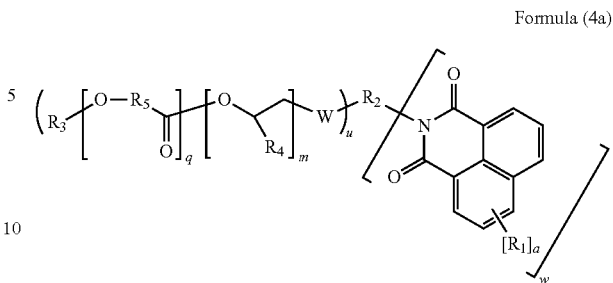

Formula (4a)

wherein each variable may independently be $R_1$ may be a substituent on Q ring in any position available for bonding to a substituent group and $R_1$ is independently represented by at least one electron withdrawing group (such as —$NO_2$, —$SO_2NR'_2$, —C(O)R', —$SO_3M$, —C(O)OM, halo e.g., —Cl or —Br, —$NH_2$, or —OR'), typically $R_1$ may be —Cl, —$SO_3M$ or —$NO_2$;

a may be 1 or 2, or 1;

W may be sulphur, >NH, >NG, oxygen or mixtures thereof (typically oxygen or >NG);

M may be H, a metal cation, —$NR'_4{}^+$, or mixtures thereof;

R' may independently be —H, or an optionally-substituted alkyl, typically, containing 1 to 20, or 1 to 10 carbon atoms, and the substituents may be hydroxyl or halo (typically Cl), or mixtures thereof;

$R_2$ may be a $C_1$ to $C_{20}$, or $C_1$ to $C_{12}$, or $C_1$ to $C_6$ hydrocarbylene group or a $C_1$ to $C_{20}$, or $C_1$ to $C_{12}$, or $C_1$ to $C_6$ hydrocarbonylene group (when $R_2$ contains more than 2 carbon atoms, the hydrocarbylene group or hydrocarbonylene group may be linear or branched), or mixtures thereof;

G may be a hydrocarbyl group containing 1 to 200, or 1 to 100, or 1 to 30 carbon atoms;

$R_3$ may be H or $C_{1-50}$ (or $C_{1-20}$)-hydrocarbonyl group (i.e., a hydrocarbyl group containing a carbonyl group) that bonds to the oxygen atom of the polymer chain forming a terminal ester group or terminal urethane group and may or may not contain a group capable of polymerization such as a vinyl group, and the substituent may be halo, ether, ester, or mixtures thereof;

$R_4$ may be H when Pol is a homopolymer, and $R_4$ may be a mixture of H (in an amount sufficient to provide ethylene oxide groups at 40 wt % to 99.99 wt %) and at least one of methyl, ethyl and phenyl, when Pol is a copolymer;

$R_5$ may be a $C_{1-19}$-hydrocarbylene group;

u may be 1 to 3, or 1 to 2, or 1;

w may be 1 to 3, or 1 to 2, or 1;

q may be 1 to 90; and m may be 1 to 90, with proviso that m is equal to or greater than q.

The polymer of the invention may have multiple polymer chain types attached to the group W. In one embodiment, the polymer chain (Pol) is based on a poly(ether) co-poly(ester). The poly(ether) co-poly(ester) may be based on a polyalkylene glycol (typically, a poly($C_2$-$C_4$-alkylene glycol) and a lactone, or a hydroxy-$C_{2-20}$-alk(en)ylene carboxylic acid or mixtures thereof. In one embodiment, the poly(ether) co-poly(ester) polymer chain may be incorporated into an imide structure represented by Formula (4b):

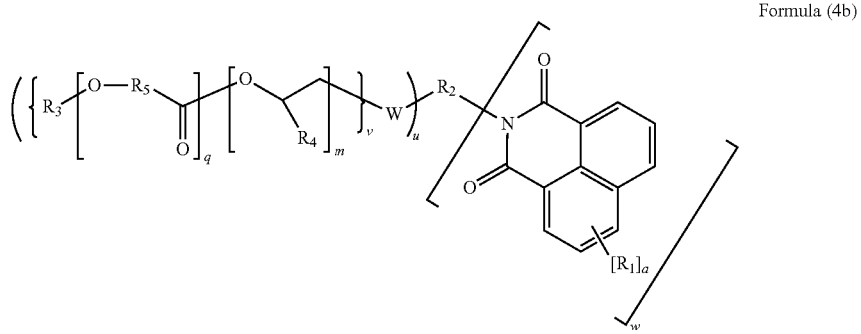

Formula (4b)

wherein
W is N (formed when $R^2$ of formula (1) is derived from a diamine or a polyamine);
$R_2$ may be a $C_1$ to $C_{20}$, or $C_1$ to $C_{12}$, or $C_1$ to $C_6$ hydrocarbylene group (when $R_2$ contains more than 2 carbon atoms, the hydrocarbylene group may be linear or branched), or mixtures thereof;
v is 2;
and wherein all other variables are defined above.

The polymer chain of Formula (4a) or (4b) may have a number average molecular weight of 200 to 10,000, or 300 to 5000, or 500 to 3000, or 600 to 2500. Typically, the polymer chain of Formula (4a) or (4b) may have number average molecular weight of 1000 to 2500.

An imide of Formula (4a) and (4b) may be prepared by different processes. The polymer chain of Formula (4a) and (4b) may be referred to as a poly(ether) co-poly(ester).

Formula (4a) may be prepared by a process that comprises reacting an imide of Formula (3a) where $R_3$ is —H, with a lactone, or a hydroxy-$C_{2-20}$-alk(en)ylene carboxylic acid, or mixtures thereof. This process may be carried out at the reaction temperature of 50° C. to 250° C. or 150° C. to 200° C., optionally in the presence of an esterification catalyst.

Formula (4b) may be prepared by a process that comprises reacting an imide of Formula (3b) where $R_3$ is —H, where $R_3$ is —H respectively, with a carboxylic acid, an acid derivative such as an acid halide, an isocyanate or mixtures thereof. The reaction conditions for capping the polymer chain to result in the polymers of the present invention with an acid, an acid derivative, or an isocyanate are reactions known in the art.

Alternatively, the imide of Formula (4a) or (4b) where $R_3$ may be a $C_{1-50}$ (or $C_{1-20}$)-hydrocarbonyl group (i.e., a hydrocarbyl group containing a carbonyl group), may be prepared by reacting an imide of Formula (3a) or (3b) where $R_3$ is —H respectively, with one or more of an acid-functionalised polyester, the reaction may be carried out at a temperature of 50° C. to 250° C. or 150° C. to 200° C., optionally in the presence of a catalyst. The acid-functionalised polyester is obtained/obtainable from the polymerisation of one or more of a hydroxy-$C_{2-20}$-alkylene carboxylic acid, a lactone, or mixtures thereof with a $C_{1-50}$ (or $C_{1-20}$)-optionally substituted hydrocarbonyl group and is conveniently performed at a temperature of 50° C. to 250° C. or 150° C. to 200° C., optionally in the presence of a catalyst, as disclosed in U.S. Pat. No. 4,861,380.

In one embodiment, the polymer of the invention may be represented by Formula (5) (i.e., the polymer may be a polyester-co-polyether):

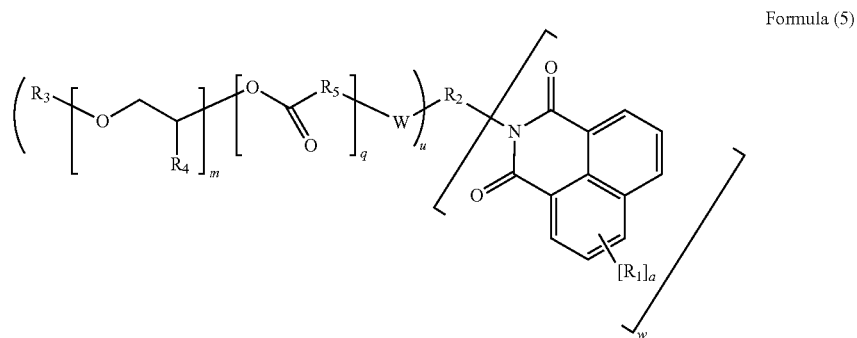

Formula (5)

with a lactone, or a hydroxy-$C_{2-20}$-alk(en)ylene carboxylic acid, or mixtures thereof. This process may be carried out at the reaction temperature of 50° C. to 250° C. or 150° C. to 200° C., optionally in the presence of an esterification catalyst.

In one embodiment, an imide represented by Formula (4a) or (4b) where $R_3$ is a $C_{1-50}$ (or $C_{1-20}$)-hydrocarbonyl group (i.e., a hydrocarbyl group containing a carbonyl group), may be prepared by reacting an imide of Formula (6a) or (6b) wherein each variable may independently be
$R_1$ may be a substituent on Q ring in any position available for bonding to a substituent group and $R_1$ is independently represented by at least one electron withdrawing group (such as —$NO_2$, —$SO_2NR'_2$, —C(O)R', —$SO_3M$, —C(O)OM, halo e.g., —Cl or —Br, —$NH_2$, or —OR'), typically $R_1$ may be —Cl, —$SO_3M$ or —$NO_2$;
a may be 1 or 2, or 1;
W may be oxygen;

M may be H, a metal cation, —NR'$_4^+$, or mixtures thereof;
R' may independently be —H, or an optionally-substituted alkyl, typically, containing 1 to 20, or 1 to 10 carbon atoms, and the substituents may be hydroxyl or halo (typically Cl), or mixtures thereof;
R$_2$ may be a C$_1$ to C$_{20}$, or C$_1$ to C$_{12}$, or C$_1$ to C$_6$ hydrocarbonylene group (when R$_2$ contains more than 2 carbon atoms, the hydrocarbonylene group may be linear or branched), or mixtures thereof;
G may be a hydrocarbyl group containing 1 to 200, or 1 to 100, or 1 to 30 carbon atoms;
R$_3$ may be H or C$_{1-50}$ (or C$_{1-20}$)-optionally substituted hydrocarbyl group that bonds to a terminal oxygen atom of the polymer chain forming a terminal ether or terminal ester group and may or may not contain a group capable of polymerization such as a vinyl group, or C$_{1-50}$ (or C$_{1-20}$)-hydrocarbonyl group (i.e., a hydrocarbyl group containing a carbonyl group) that bonds to the oxygen atom of the polymer chain forming a terminal ester group or terminal urethane group and may or may not contain a group capable of polymerization such as a vinyl group, and the substituent may be halo, ether, ester, or mixtures thereof;
R$_4$ may be H when Pol is a homopolymer, and R$_4$ may be a mixture of H (in an amount sufficient to provide ethylene oxide groups at 40 wt % to 99.99 wt %) and at least one of methyl, ethyl and phenyl, when Pol is a copolymer;
R$_5$ may be a C$_{1-19}$-hydrocarbylene group;
u may be 1 to 3, or 1 to 2, or 1;
w may be 1 to 3, or 1 to 2, or 1;
q may be 1 to 90; and
m may be 1 to 90, with proviso that m is equal to or greater than q.

The polymer chain of Formula (5) may have a number average molecular weight of 200 to 10,000, or 300 to 5000, or 500 to 3000, or 1000 to 2500. Typically, the polymer chain of Formula (5) may have number average molecular weight of 1000 to 2500.

An imide of Formula (5) may be prepared by a process comprising steps:
(i) reacting an amino acid with a fused aromatic di-acid or anhydride to form an acid-functionalised fused aromatic imide, and then reacting acid-functionalised fused aromatic imide with one or more of a hydroxy-C$_{2-20}$-alk(en)ylene carboxylic acid or a lactone or mixture thereof. The reaction of the acid-functionalised fused aromatic imide, with one or more hydroxy-C$_{2-20}$-alk(en)ylene carboxylic acid, a lactone or mixture thereof, may be carried out at a temperature of 50° C. to 250° C. or 150° C. to 200° C., optionally in the presence of an esterification catalyst; and
(ii) reacting a product of step (i) with a polyalkylene glycol mono-substituted alk(en)ylene ether, at a temperature of 50° C. to 250° C. or 150° C. to 200° C., optionally in the presence of an esterification catalyst.

Alternatively, the polymer of Formula (5) may be obtained/obtainable by reacting:
(i) either a polyethyene glycol mono-substituted alk(en)ylene ether or a poly(ethyleneglycol-co-alkylene glycol) mono-substituted alk(en)ylene ether with one or more hydroxy-C$_{2-20}$-alk(en)ylene carboxylic acid and/or lactone at a temperature of 50° C. to 250° C. or 150° C. to 200° C., optionally in the presence of an esterification catalyst to form a hydroxyl-terminated polymer; and
(ii) reacting the product of (i) with an acid-functionalised fused aromatic imide at a temperature of 50° C. to 250° C. or 150° C. to 200° C., optionally in the presence of an esterification catalyst.

INDUSTRIAL APPLICATION

The particulate solid present in the composition may be any inorganic or organic solid material which is substantially insoluble in the organic medium and/or insoluble in water at the temperature concerned and which it is desired to stabilize in a finely divided form therein. The particulate solids may be in the form of a granular material, a fibre, a platelet or in the form of a powder, often a blown powder. In one embodiment, the particulate solid is a pigment.

The particulate solid (typically a pigment or filler) may have an average particle size measured by light scattering measurements of from 10 nanometers to 10 microns, or 10 nanometers to 1, 2, 3, or 5 microns, or 20 nanometers to 1, 2, 3, or 5 microns in diameter.

Examples of suitable solids are pigments, extenders, fillers, blowing agents and flame retardants for paints and plastic materials; dyes, especially disperse dyes; optical brightening agents and textile auxiliaries; pigments for inks, toners; solids for oil-based and inverse-emulsion drilling muds; dirt and solid particles in dry cleaning fluids; metals; particulate ceramic materials and magnetic materials for ceramics, piezoceramic printing, refactories, abrasives, foundry, capacitors, fuel cells, ferrofluids, conductive inks, magnetic recording media, water treatment and hydrocarbon soil remediation; organic and inorganic nanodisperse solids; metal, metal oxides and carbon for electrodes in batteries, fibres such as wood, paper, glass, steel, carbon and boron for composite materials; and biocides, agrochemicals and pharmaceuticals which are applied as dispersions in organic media.

In one embodiment, the solid is an organic pigment from any of the recognised classes of pigments described, for example, in the Third Edition of the Colour Index (1971) and subsequent revisions of, and supplements thereto, under the chapter headed "Pigments". Examples of organic pigments are those from the azo, disazo, trisazo, condensed azo, azo lakes, naphthol pigments, anthanthrone, anthrapyrimidine, anthraquinone, benzimidazolone, carbazole, diketopyrrolopyrrole, flavanthrone, indigoid pigments, indanthrone, isodibenzanthrone, isoindanthrone, isoindolinone, isoindoline, isoviolanthrone, metal complex pigments, oxazine, perylene, perinone, pyranthrone, pyrazoloquinazolone, quinacridone, quinophthalone, thioindigo, triarylcarbonium pigments, triphendioxazine, xanthene and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. In one embodiment, the organic pigments are phthalocyanines, especially copper phthalocyanines, monoazos, disazos, indanthrones, anthranthrones, quinacridones, diketopyrrolopyrroles, perylenes and carbon blacks.

Examples of inorganic pigments include metallic oxides such as titanium dioxide, rutile titanium dioxide and surface coated titanium dioxide, titanium oxides of different colours such as yellow and black, iron oxides of different colours such as yellow, red, brown and black, zinc oxide, zirconium oxides, aluminium oxide, oxymetallic compounds such as bismuth vanadate, cobalt aluminate, cobalt stannate, cobalt zincate, zinc chromate and mixed metal oxides of two or more of manganese, nickel, titanium, chromium, antimony, magnesium, cobalt, iron or aluminium, Prussian blue, vermillion, ultramarine, zinc phosphate, zinc sulphide, molybdates and chromates of calcium and zinc, metal effect pigments such as aluminium flake, copper, and copper/zinc alloy, pearlescent flake such as lead carbonate and bismuth oxychloride.

Inorganic solids include extenders and fillers such as ground and precipitated calcium carbonate, calcium sulphate, calcium oxide, calcium oxalate, calcium phosphate, calcium phosphonate, barium sulphate, barium carbonate, magnesium oxide, magnesium hydroxide, natural magnesium hydroxide or brucite, precipitated magnesium hydroxide, magnesium carbonate, dolomite, aluminium trihydroxide, aluminium hydroperoxide or boehmite, calcium and magnesium silicates, aluminosilicates including nanoclays, kaolin, montmorillonites including bentonites, hectorites and saponites, ball clays including natural, synthetic and expandable, mica, talc including muscovites, phlogopites, lepidolites and chlorites, chalk, synthetic and precipitated silica, fumed silica, metal fibres and powders, zinc, aluminium, glass fibres, refractory fibres, carbon black including single- and multi-walled carbon nanotubes, reinforcing and non-reinforcing carbon black, graphite, Buckminsterfullerenes, asphaltene, graphene, diamond, alumina, quartz, perlite, pegmatite, silica gel, wood flour, wood flake including soft and hard woods, saw dust, powdered paper/fibre, cellulosic fibres such as kenaf, hemp, sisal, flax, cotton, cotton linters, jute, ramie, rice husk or hulls, raffia, typha reed, coconut fibre, coir, oil palm fibre, kapok, banana leaf, caro, curaua, henequen leaf, harakeke leaf, abaca, sugar cane bagasse, straw, bamboo strips, wheat flour, MDF and the like, vermiculite, zeolites, hydrotalcites, fly ash from power plants, icinerated sewage sludge ash, pozzolanes, blast furnace slag, asbestos, chrysotile, anthophylite, crocidolite, wollastonite, attapulgite and the like, particulate ceramic materials such as alumina, zirconia, titania, ceria, silicon nitride, aluminium nitride, boron nitride, silicon carbide, boron carbide, mixed silicon-aluminium nitrides and metal titanates; particulate magnetic materials such as the magnetic oxides of transition metals, often iron and chromium, e.g., gamma-$Fe_2O_3$, $Fe_3O_4$, and cobalt-doped iron oxides, ferrites, e.g., barium ferrites; and metal particles, for instance metallic aluminium, iron, nickel, cobalt, copper, silver, gold, palladium, and platinum and alloys thereof.

Other useful solid materials include flame retardants such as pentabromodiphenyl ether, octabromodiphenyl ether, decabromodiphenyl ether, hexabromocyclododecane, ammonium polyphosphate, melamine, melamine cyanurate, antimony oxide and borates; biocides or industrial microbial agents such as those mentioned in tables 2, 3, 4, 5, 6, 7, 8 and 9 of the chapter entitled "Industrial Microbial Agents" in Kirk-Othmer's Encyclopedia of Chemical Technology, Volume 13, 1981, $3^{rd}$ Edition, and agrochemicals such as the fungicides flutriafen, carbendazim, chlorothalonil and mancozeb.

In one embodiment, the polar liquid medium is water but may contain up to 60% by weight of a water-soluble co-solvent. Examples of such co-solvents are diethylene glycol, glycerol, 2-pyrrolidone, N-methylpyrrolidone, cyclohexanol, caprolactone, caprolactam, pentane-1,5-diol, 2-(butoxyethoxy) ethanol and thiodiglycol, ethylene glycol including mixtures thereof.

Such a millbase or dispersion is useful for the preparation of water-borne paints and inks by admixture with further amounts of water-compatible resin(s) and/or water and other ingredients which are conventionally incorporated into water-borne paints and inks, such as preservatives, stabilisers, antifoaming agents, water miscible cosolvents and coalescing agents.

The water compatible resin may be any water-soluble or water insoluble polymer which is used in the water-borne coating industry. Examples of polymers which are commonly used as the principal film-forming binder resin in latex or water-reducible coatings are acrylic, vinyl ester, polyurethane, polyester, epoxy and alkyd.

The organic medium present in the composition of the invention, in one embodiment, is a plastics material and in another embodiment an organic liquid. The organic liquid may be a polar organic liquid. By the term "polar" in relation to the organic liquid it is meant that an organic liquid is capable of forming moderate to strong bonds as described in the article entitled "A Three Dimensional Approach to Solubility" by Crowley et al in Journal of Paint Technology, Vol. 38, 1966, at page 269. Such organic liquids generally have a hydrogen bonding number of 5 or more as defined in the abovementioned article.

Examples of suitable polar organic liquids are amines, ethers, especially lower alkyl ethers, organic acids, esters, ketones, glycols, glycol ethers, glycol esters, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39-40 and these liquids all fall within the scope of the term polar organic liquid as used herein.

In one embodiment, polar organic liquids are dialkyl ketones, alkyl esters of alkane carboxylic acids and alkanols, especially such liquids containing up to, and including, a total of 6 carbon atoms. As examples of the polar organic liquids include dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxy propylacetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol (also known as 2-methylpropanol), terpineol and dialkyl and cyclic ethers such as diethyl ether and tetrahydrofuran. In one embodiment, solvents are alkanols, alkane carboxylic acids and esters of alkane carboxylic acids. In one embodiment, the present invention is suitable for organic liquids that are substantially non-soluble in an aqueous medium. Furthermore a person skilled in the art will appreciate that small quantities of an aqueous medium (such as glycols, glycol ethers, glycol esters and alcohols) may be present in the organic liquids provided the overall organic liquid is substantially non-soluble in an aqueous medium.

Examples of organic liquids, which may be used as polar organic liquids are film-forming resins such as are suitable for the preparation of inks, paints and chips for use in various applications such as paints and inks. Examples of such resins include polyamides, such as Versamid™ and Wolfamid™, and cellulose ethers, such as ethyl cellulose and ethyl hydroxyethyl cellulose, nitrocellulose and cellulose acetate butyrate resins, including mixtures thereof. Examples of paint resins include short oil alkyd/melamine-formaldehyde, polyester/melamine-formaldehyde, thermosetting acrylic/melamine-formaldehyde, long oil alkyd, medium oil alkyd, short oil alkyd, polyether polyols and multi-media resins such as acrylic and urea/aldehyde.

The organic liquid may be a polyol, that is to say, an organic liquid with two or more hydroxy groups. In one embodiment, polyols include alpha-omega diols or alpha-omega diol ethoxylates.

In one embodiment, the organic liquid comprises at least 0.1% by weight, or 1% by weight or more of a polar organic liquid based on the total organic liquid. The organic liquid optionally further comprises water. In one embodiment, the organic liquid is free of water (typically less than 2 wt % water, or less than 1 wt % water, or less than 0.5 wt % water, or less than 0.1 wt %).

The plastics material may be a thermosetting resin. The thermosetting resins useful in this invention include resins which undergo a chemical reaction when heated, catalysed, or subject to ultra-violet, laser light, infra-red, cationic, electron beam, or microwave radiation and become relatively infusible. Typical reactions in thermosetting resins include oxidation of unsaturated double bonds, reactions involving epoxy/amine, epoxy/carbonyl, epoxy/hydroxyl, reaction of epoxy with a Lewis acid or Lewis base, polyisocyanate/hydroxy, amino resin/hydroxy moieties, free radical reactions or polyacrylate, cationic polymerization of epoxy resins and vinyl ether and condensation of silanol. Examples of unsaturated resins include polyester resins made by the reaction of one or more diacids or anhydrides with one or more diols. Such resins are commonly supplied as a mixture with a reactive monomer such as styrene or vinyltoluene and are often referred to as orthophthalic resins and isophthalic resins. Further examples include resins using dicyclopentadiene (DCPD) as a co-reactant in the polyester chain. Further examples also include the reaction products of bisphenol A diglycidyl ether with unsaturated carboxylic acids such as methacrylic acid, subsequently supplied as a solution in styrene, commonly referred to as vinyl ester resins.

In one embodiment, the thermosetting composite or thermosetting plastic may be a polyester, a polyvinyl acetate, a polyester resin in styrene, a polystyrene, or mixtures thereof.

Polymers with hydroxy functionality (frequently polyols) are widely used in thermosetting systems to crosslink with amino resins or polyisocyanates. The polyols include acrylic polyols, alkyd polyols, polyester polyols, polyether polyols and polyurethane polyols. Typical amino resins include melamine formaldehyde resins, benzoguanamine formaldehyde resins, urea formaldehyde resins and glycoluril formaldehyde resins. Polyisocyanates are resins with two or more isocyanate groups, including both monomeric aliphatic diisocyanates, monomeric aromatic diisocyanates and their polymers. Typical aliphatic diisocyanates include hexamethylene diisocyanate, isophorone diisocyanate and hydrogenated diphenylmethane diisocyanate. Typical aromatic isocyanates include toluene diisocyanates and biphenylmethane diisocyanates.

If desired, the compositions of the present invention may contain other ingredients, for example resins (where these do not already constitute the organic medium), binders, co-solvents, cross-linking agents, fluidising agents, wetting agents, anti-sedimentation agents, plasticisers, surfactants, dispersants other than the compound of the present invention, humectants, anti-foamers, anti-cratering agents, rheology modifiers, heat stabilizers, light stabilizers, UV absorbers, antioxidants, leveling agents, gloss modifiers, biocides and preservatives.

If desired, the compositions containing thermosetting plastic material may contain other ingredients, for example dispersants other than the compound of the present invention, blowing agents, flame retardants, process aids, surfactants, heat stabilizers, UV absorbers, anti-oxidants, fragrances, mould release aids, anti-static agents, anti-microbial agents, biocides, coupling agents, lubricants (external and internal), air release agents and viscosity depressants.

The compositions typically contain from 1 to 95% by weight of the particulate solid, the precise quantity depending on the nature of the solid and the quantity depending on the nature of the solid and the relative densities of the solid and the polar organic liquid. For example, a composition in which the solid is an organic material, such as an organic pigment, in one embodiment, contains from 15 to 60% by weight of the solid whereas a composition in which the solid is an inorganic material, such as an inorganic pigment, filler or extender, in one embodiment, contains from 40 to 90% by weight of the solid based on the total weight of composition.

The compositions containing an organic liquid may be prepared by any of the conventional methods known for preparing dispersions. Thus, the solid, the organic medium and the dispersant may be mixed in any order, the mixture then being subjected to a mechanical treatment to reduce the particles of the solid to an appropriate size, for example by high speed mixing, ball milling, basket milling, bead milling, gravel milling, sand grinding, attritor grinding, two roll or three roll milling, plastic milling until the dispersion is formed. Alternatively, the solid may be treated to reduce its particle size independently or in admixture with either the organic medium or the dispersant, the other ingredient or ingredients then being added and the mixture being agitated to provide the composition. The composition can also be made by grinding or milling the dry solid with the dispersant and then adding the liquid medium or mixing the solid with the dispersant in a liquid medium in a pigment flushing process.

The composition containing the plastic material may be prepared by any of the conventional methods known for preparing thermoplastic compounds. Thus, the solid, the thermoplastic polymer, and the dispersant may be mixed in any order, the mixture then being subjected to a mechanical treatment to reduce the particles of the solid to an appropriate size, for example, by Banbury mixing, ribbon blending, twin-screw extrusion, twin-roll milling, compounding in a Buss co-kneader, or similar equipment.

The composition of the present invention is particularly suited to liquid dispersions. In one embodiment, such dispersion compositions comprise:
(a) from 0.5 to 80 parts of a particulate solid;
(b) from 0.1 to 79.6 parts of a polymer of formula (1); and
(c) from 19.9 to 99.4 parts of an organic liquid and/or water;
wherein all relative parts are by weight and the amounts (a)+(b)+(c)=100.

In one embodiment, component a) comprises from 0.5 to 30 parts of a pigment and such dispersions are useful as (liquid) inks, paints and millbases.

If a composition is required comprising a particulate solid and a dispersant of Formula (1) in dry form, the organic liquid is typically volatile so that it may be readily removed from the particulate solid by a simple separation means such as evaporation. In one embodiment, the composition comprises the organic liquid.

If the dry composition consists essentially of the dispersant of formula (1) and the particulate solid, it typically contains at least 0.2%, at least 0.5% or at least 1.0% dispersant of formula (1) based on weight of the particulate solid. In one embodiment, the dry composition contains not greater than 100%, not greater than 50%, not greater than 20% or not greater than 10% by weight of dispersant of formula (1) based on the weight of the particulate solid.

As disclosed hereinbefore, the compositions of the invention are suitable for preparing millbases wherein the particulate solid is milled in an organic liquid in the presence of a compound for formula (1).

Thus, according to a still further aspect of the invention there is provided a millbase comprising a particulate solid, an organic liquid and a polymer of formula (1).

Typically, the millbase contains from 20 to 70% by weight particulate solid based on the total weight of the millbase. In one embodiment, the particulate solid is not less than 10 or not less than 20% by weight of the millbase. Such millbases may optionally contain a binder added either before or after milling.

In one embodiment, the binder is a polymeric material capable of binding the composition on volatilisation of the organic liquid.

Binders are polymeric materials including natural and synthetic materials. In one embodiment, binders include poly(meth)acrylates, polystyrenics, polyesters, polyurethanes, alkyds, polysaccharides such as cellulose, nitrocellulose, and natural proteins such as casein. The binder may be nitrocellulose. In one embodiment, the binder is present in the composition at more than 100% based on the amount of particulate solid, more than 200%, more than 300% or more than 400%.

The amount of optional binder in the millbase can vary over wide limits but is typically not less than 10%, and often not less than 20% by weight of the continuous/liquid phase of the millbase. In one embodiment, the amount of binder is not greater than 50% or not greater than 40% by weight of the continuous/liquid phase of the millbase.

The amount of dispersant in the millbase is dependent on the amount of particulate solid but is typically from 0.5 to 5% by weight of the millbase.

Dispersions and millbases made from the composition of the invention are particularly suitable for use in non-aqueous and solvent free formulations in which energy curable systems (ultra-violet, laser light, infra-red, cationic, electron beam, microwave) are employed with monomers, oligomers, etc. or a combination present in the formulation. They are particularly suitable for use in coatings such as paints, varnishes, inks, other coating materials and plastics. Suitable examples include their use in low, medium and high solids paints, general industrial paints including baking, two component and metal coating paints such as coil and can coatings, powder coatings, UV-curable coatings, wood varnishes; inks, such as flexographic, gravure, offset, lithographic, letterpress or relief, screen printing and printing inks for packaging printing, non impact inks such as inkjet inks including continuous inkjet and drop on demand inkjet which include thermal, piezo and electrostatic, phase change inks and hot melt wax inks, inks for ink jet printers and print varnishes such as overprint varnishes; polyol and plastisol dispersions; non-aqueous ceramic processes, especially tape-casting, gel-casting, doctor-blade, extrusion and injection moulding type processes, a further example would be in the preparation of dry ceramic powders for isostatic pressing; composites such as sheet moulding and bulk moulding compounds, resin transfer moulding, pultrusion, hand-lay-up and spray-lay-up processes, matched die moulding; construction materials like casting resins, cosmetics, personal care like nail coatings, sunscreens, adhesives, toners such as liquid toners, plastics materials and electronic materials such as coating formulations for colour filter systems in displays including organic light-emitting diode (OLED) devices, liquid crystal displays and electrophoretic displays, glass coatings including optical fibre coatings, reflective coatings or anti-reflective coatings, conductive and magnetic inks and coatings. They are useful in the surface modification of pigments and fillers to improve the dispersibility of dry powders used in the above applications. Further examples of coating materials are given in Bodo Muller, Ulrich Poth, Lackformulierung und Lackrezeptur, Lehrbuch fr Ausbildung und Praxis, Vincentz Verlag, Hanover (2003) and in P. G. Garrat, Strahlenhartung, Vincentz Verlag, Hanover (1996). Examples of printing ink formulations are given in E. W. Flick, Printing Ink and Overprint Varnish Formulations—Recent Developments, Noyes Publications, Park Ridge N.J., (1990) and subsequent editions Dispersions and millbases made from the composition of the invention are also useful for contact and non-contact (drop on demand) aqueous printing processes such as aqueous flexo, aqueous inkjet, aqueous UV inkjet In one embodiment, the composition of the invention further includes one or more additional known dispersants.

The following examples provide illustrations of the invention. These examples are non exhaustive and are not intended to limit the scope of the invention.

EXAMPLES

Comparative Example 1 (CE1)

A dispersant is prepared according to Example 1 in US Patent publication 2005/0120911 except Surfonamine™ L207 replaces XJT-507. 1,2,4-Benzene tricarboxylic anhydride (12.97 parts) is added to a stirrer polyether amine (150 parts Surfonamine® L207 ex Huntsman). The reaction is stirred at 110° C. under nitrogen for 3 hours then at 150° C. for 8 hours. The IR is consistent with imide formation and the acid value is 25.6 mg KOH/g.

Comparative Example 2 (CE2)

1,8 Naphthalic anhydride (14.46 parts) is added to a stirrer polyether amine (150 parts Surfonamine® L207 ex Huntsman (71 wt % ethylene oxide, and 29 wt % propylene oxide). The reaction is stirred at 100° C. under nitrogen for 8 hours then at 150° C. for 12 hours. The IR is consistent with imide formation and the final product has an acid value 5.46 mg KOH/g. The product is similar to a dispersant prepared according to the disclosure in U.S. Pat. No. 6,440,207.

Example 1

3-Nitro-1,8-naphthalic anhydride (14.46 parts) is added to a stirrer polyether amine (150 parts Surfonamine® L207 ex Huntsman). The reaction is stirred at 90° C. under nitrogen for 5 hours then at 150° C. for 6 hours. The IR is consistent with imide formation and the final product acid value is 1.61 mg KOH/g.

Example 2

3-Nitro-1,8-naphthalic anhydride (18.36 parts) is added to a stirrer polyether amine (81.64 parts Surfonamine® L100 ex Huntsman). The reaction is stirred at 100° C. under nitrogen for 1 hour then at 175° C. for 3 hours. The IR is consistent with imide formation and the final product acid value is 0.82 mg KOH/g.

Example 3

3-Nitro-1,8-naphthalic anhydride (16.2 parts) is added to a stirrer polyether amine (133.76 parts Surfonamine® L200 ex Huntsman). The reaction is stirred at 100° C. under nitrogen for 1 hour then at 175° C. for 3 hours. The IR is consistent with imide formation and the final product acid value is 0.78 mg KOH/g.

Dispersion Test 1

Separate dispersions are prepared containing a polymer of examples 1 to 3, CE1 and CE2. Each dispersion contains polymer (15 parts), water (97.05 parts), propylene glycol (7.5 parts), antifoam (0.45 parts DF1396 ex eChem) and Pigment Red 122 (30 parts, Inkjet Magenta E02 VP2621 ex Clariant) are charged to a Dispermat™ F1 Pot. Glass beads are then added (190 parts) under agitation and the mixture is milled on a Dispermat™ F1 mill for 60 minutes at 2000 rpm. The resulting mill base is filtered to remove beads. To the mill base (120 parts) is added water (38 parts) and Propylene glycol (2 parts) and Antifoam (0.12 parts DF1396 ex eChem). The resulting dispersion is milled at 4000 rpm for 1 hour at 20° C. in a WAB™ mill (A Willy A. Bachofen Research lab mill) using 0.1 mm Zirconium beads (185 parts) in the milling chamber. The dispersions are left to age at 50° C. over a period of three weeks. The particle size is then measured using a Nanotrac™ Particle Size analyser. The particle size (PS) measured for each dispersion is shown below. Typically, better results are obtained for dispersions with lower particle sizes after three weeks. The results obtained are:

| Example | PS$^1$ | PS$^2$ | PS$^3$ | PS$^4$ | PS$^5$ | PS$^6$ |
|---------|--------|--------|--------|--------|--------|--------|
| CE 1    | D.N.M. |        |        |        |        |        |
| CE 2    | 197    | 454    | >500   | >2000  | 500    | >2000  |
| 1       | 104    | 191    | 103    | 170    | 105    | 164    |
| 2       | 105    | 178    | 105    | 182    | 110    | 181    |
| 3       | 110    | 207    | 104    | 170    | 101    | 186    |

Footnote:
D.N.M. is did not mill. Therefore dispersion properties could not be measured
PS$^1$ is D50 (nm) Initial
PS$^2$ is D90 (nm) Initial
PS$^3$ is D50 (nm) after 1 week (50° C.)
PS$^4$ is D90 (nm) after 1 week (50° C.)
PS$^5$ is D50 (nm) after 3 weeks (50° C.)
PS$^6$ is D90 (nm) after 3 weeks (50° C.)

CE1 gelled during milling and did not produce a fluid dispersion. CE2 produced a dispersion that was not stable. The dispersions containing polymers of the invention remain fluid and have a desirable average particle size for inkjet printing applications. The dispersions containing polymers of the invention also remain stable with time.

Intermediate A

3-Nitro-1,8-naphthalic anhydride (12.5 parts) is dissolved in concentrated sulphuric acid (95.5 parts) and cooled to 0° C. A blend of concentrated sulphuric acid (23.9 parts) and concentrated nitric acid (4.4 parts) is added over 45 minutes at 0° C. then stirred under nitrogen for 17 hours at 21° C. The reaction mixture is poured over ice then filtered. The resulting precipitate is washed with water and is recrystallized from acetic acid. The resulting product is a brown solid with a nitrogen content of 7.8% and the NMR is consistent with di-nitration.

Intermediate B 1,2-naphthalic anhydride (6.3 parts) is dissolved in concentrated sulphuric acid (46.7 parts) and cooled to 0° C. A blend of concentrated sulphuric acid (11.96 parts) and concentrated nitric acid (2.2 parts) is added over 1 hour at 0° C. then stirred under nitrogen for 17 hours at 21° C. The reaction mixture is poured over ice then filtered. The resulting precipitate washed with water recrystallized from acetic acid. The resulting product is a yellow solid with a nitrogen content of 4.1% and the NMR is consistent with mono-nitration.

Intermediate C 2,3-naphthalic anhydride (6.3 parts) is dissolved in concentrated sulphuric acid (46.7 parts) and cooled to 0° C. A blend of concentrated sulphuric acid (11.96 parts) and HNO$_3$ (2.2 parts) mixture is added over 1 hour at 0° C. then stirred for 17 hours at 21° C. The reaction mixture is poured over ice and filtered. The resulting precipitate is washed with water recrystallized from acetic acid. The resulting product is a yellow solid with a nitrogen content of 3.6% and the NMR is consistent with mono-nitration.

Intermediate D 1,8-naphthalic anhydride (10 parts) is added to sulphuric acid, (30 parts 30% as free SO$_3$ and 30 parts 20% as free SO$_3$) over 25 minutes at 0° C. The mixture is heated to 95° C. for 1 hour then poured over iced water (70 parts). The resulting precipitate is filtered and washed with glacial acetic acid (40 parts), hexane (40 parts) and hydrochloric acid (40 parts) then dried. The resulting product was a grey solid with a sulphur content of 10.3% and the NMR is consistent with mono-sulphonation.

Intermediate E 2-(2-aminoethoxy)ethanol (30.27 parts) is added to 3-nitro-1,8-naphthalic anhydride (70.00 parts) and is stirred under nitrogen for 6 hours at 180° C. The IR is consistent with imide formation and the final product acid value is 0.57 mg KOH/g

Example 4

Intermediate A (3.5 parts) is added to a stirred polyether amine (26.47 parts, Surfonamine® L207 ex Huntsman). The reaction is stirred at 100° C. for 1 hour and then heated to 180° C. for 2 hours under nitrogen. The IR is consistent with imide formation and the final product acid value is 0.85 mg KOH/g.

Example 5

4-Chloro-1,8-naphthalic anhydride (4.85 parts) is added to a stirred polyether amine (45.15 parts Surfonamine® L207 ex Huntsman). The reaction is stirred at 100° C. under nitrogen for 1 hour and then at 180° C. for 2 hours. The IR is consistent with imide formation and the final product acid value is 3.63 mg KOH/g.

Example 6

4-Nitro-1,8-naphthalic anhydride (2.25 parts) is added to a stirrer polyether amine (22.75 parts, Surfonamine® L207 ex Huntsman). The reaction is stirred at 100° C. 1 hour and then at 180° C. for 2 hours under nitrogen. The IR is consistent with imide formation and the final product acid value is 6.75 mg KOH/g.

Example 7

4-Bromo-1,8-naphthalic anhydride (2.27 parts) is added to a stirrer polyether amine (17.73 parts, Surfonamine® L207 ex Huntsman) with agitation. The reaction is stirred at 100° C. for 1 hour and then at 180° C. for 2 hours under nitrogen. The IR is consistent with imide formations and the final product acid value is 5.25 mg KOH/g.

Example 8

Intermediate B (1.45 parts) is added to a stirrer polyether amine (14.68 parts, Surfonamine® L207 ex Huntsman). The reaction is stirred at 100° C. 1 hour and then at 180° C. for 5 hours under nitrogen. The IR is consistent with imide formation and the final product acid value is 2.49 mg KOH/g.

Example 9

Intermediate C (1.45 parts) is added to a stirrer polyether amine (14.68 parts, Surfonamine® L207 ex Huntsman). The reaction is stirred at 100° C. 1 hour and then at 180° C. for 5 hours under nitrogen. The IR is consistent with imide formation and the final product acid value is 1.38 mg KOH/g.

Example 10

Triethylamine (0.405 parts) is added to a stirred solution of Intermediate D (1.092 parts) dissolved in acetone (50 parts). The reaction is stirred for 30 minutes at room temperature, then polyether polyether amine (8.50 parts, Surfonamine® L207 ex Huntsman) is added. The reaction mixture is stirred at 70° C. for 1 hour remove the acetone by distillation. The mixture is then heated to 100° C. for 1 hour and 175° C. for 2 hours. The IR is consistent with imide formation and the final product acid value is 23.5 mg KOH/g.

Intermediate E (101.57 parts) and potassium hydroxide (3.0 parts) are stirred under nitrogen and heated to 155° C. in a pressure vessel. Ethylene oxide (314 parts) is added over 52 hours and heated at 155° C. for a further 16 hours. The resulting product is a brown liquid and the molecular weight is Mn=700 and Mw=1342 as determined by GPC (THF eluent, polystyrene Standards).

Dispersion Test 2

A dispersion is prepared by dissolving examples 4 to 9 (0.9 parts) in water (7.6 parts) with antifoam (0.01 parts, BYK024 ex Byk Chemie). 3 mm glass beads (17.0 parts) and Pigment Violet 19 (1.5 parts, Inkjet Magenta E5BO2 ex Clariant) is added and the contents milled on a horizontal shaker for 16 hours. The resulting fluid dispersion (2.5 parts) is let down into an ink solution (10 parts). The ink solution is prepared by adding 2-pyrrolidinone (2.33 parts), 1,5-pentanediol (5.83 parts), glycerol (11.66 parts) and wetting agent (0.58 parts, Tego® Wet 10% ex Evonik) to distilled water (74.6 parts). The particle size (PS) measured for each dispersion is shown below:

| Example | PS$^1$ | PS$^2$ | PS$^3$ | PS$^4$ |
|---|---|---|---|---|
| CE 1 | 1682 | 2057 | 4020 | 5940 |
| CE 2 | 214 | 387 | 1669 | 2718 |
| 4 | 151 | 298 | 221 | 504 |
| 1 | 151 | 284 | 373 | 644 |
| 2 | 175 | 295 | 382 | 652 |
| 3 | 154 | 261 | 389 | 970 |
| 4 | 151 | 298 | 221 | 504 |
| 5 | 143 | 301 | 418 | 843 |
| 6 | 164 | 251 | 770 | 1013 |
| 7 | 165 | 298 | 434 | 627 |
| 8 | 160. | 242 | 377 | 574 |
| 9 | 152 | 270 | 382 | 962 |

Dispersion Test 3

A dispersion is prepared by dissolving Examples 1,2,10 and 11 (0.9 parts) in water (7.6 parts). 3 mm glass beads (17.0 parts) and pigment black (1.5 parts, Nipex® Black ex Evonik) is added and the contents milled on a horizontal shaker. The particle size (PS) was measured for each dispersion. Low particle sizes were achieved for all dispersions.

| Example | Nipex® grade | Milling time/hours | PS$^1$ | PS$^2$ |
|---|---|---|---|---|
| 1 | 160IQ | 16 | 140 | 195 |
| 2 | 160IQ | 16 | 130 | 198 |
| 10 | 180IQ | 16 | 173 | 300 |
| 11 | 180IQ | 2 | 145 | 248 |

Overall, the results indicate that the polymers of the invention provide at least one of improving increasing a particulate solid load, forming improved dispersions, having improved brightness, and producing a composition with reduced viscosity in an aqueous medium.

The terms "hydrocarbyl" or "hydrocarbylene" denotes a group having a carbon atom directly attached to the remainder of the molecule and having a hydrocarbon or predominantly hydrocarbon character within the context of this invention. Such groups include the following: (1) Purely hydrocarbon groups; that is, aliphatic, (e.g., alkyl or alkenyl), alicyclic (e.g., cycloalkyl or cycloalkenyl), aromatic, aliphatic- and alicyclic-substituted aromatic, aromatic-substituted aliphatic and alicyclic groups, and the like, as well as cyclic groups wherein the ring is completed through another portion of the molecule (that is, any two indicated substituents may together form an alicyclic group). Such groups are known to those skilled in the art. Examples include methyl, ethyl, octyl, decyl, octadecyl, cyclohexyl, phenyl, etc. (2) Substituted hydrocarbon groups; that is, groups containing non-hydrocarbon substituents which do not alter the predominantly hydrocarbon character of the group. Those skilled in the art will be aware of suitable substituents. Examples include hydroxy, nitro, cyano, alkoxy, acyl, etc (3) Hetero groups; that is, groups which, while predominantly hydrocarbon in character, contain atoms other than carbon in a chain or ring otherwise composed of carbon atoms. Suitable hetero atoms will be apparent to those skilled in the art and include, for example, nitrogen, oxygen and sulphur.

As described hereinafter the number average molecular weight of the polymer of the present invention has been determined using known methods, such as Gel Permeation Chromatography (GPC) analysis using a polystyrene standard for all polymer chains except those that contain ethylene oxide. The number average molecular weight of a polymer chain containing ethylene oxide is determined by GPC (tetrahydrofuran eluent, polyethylene glycol standards).

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements.

As used herein the term "hydrocarbylene" is used in the ordinary sense of the term and is intended to include any divalent radical formed by removing two hydrogen atoms from a hydrocarbon.

As used herein the term "hydrocarbylene" is intended to include any hydrocarbon group containing a carbonyl group (>C=O) e.g., a hydrocarbon group containing a ketone group or an aldehyde group.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A polymer comprising a polymer chain having at least one fused aromatic imide pendant group, wherein the polymer is represented by formula (1):

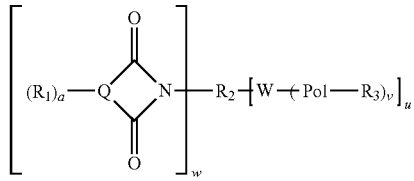

Formula (1)

wherein each variable is independently
  $R_1$ is a substituent on Q ring in any position available for bonding to a substituent group and $R_1$ is independently represented by at least one electron withdrawing group selected from —CN, —NO$_2$, —SO$_2$NR'$_2$, —SO$_3$M, Cl, —Br, —NH$_2$, or —OR' wherein M is H, a metal cation, —NR'$_4^+$, or mixtures thereof;
  a is 1 or 2;
  W is oxygen, sulphur, >NH, or >NG;
  R' is independently —H, or an optionally-substituted alkyl containing 1 to 20 carbon atoms, and the substituents is hydroxyl or halogen or mixtures thereof;
  $R_2$ is a $C_1$ to $C_{20}$ hydrocarbylene group or a $C_1$ to $C_{20}$ hydrocarbonylene group, the hydrocarbylene group or hydrocarbonylene group is linear or branched;
  $R_3$ is H or $C_{1-50}$-optionally substituted hydrocarbyl group that bonds to a terminal oxygen atom of the polymer chain forming a terminal ether or terminal ester group and may or may not contain a group capable of polymerization such as a vinyl group, or $C_{1-50}$-hydrocarbonyl group that bonds to the oxygen atom of the polymer chain forming a terminal ester group or terminal urethane group and may or may not contain a group capable of polymerization such as a vinyl group, and the substituent is halo, ether, ester, or mixtures thereof;
  Pol is a) a homopolymer chain of ethylene oxide, b) a copolymer chain of ethylene oxide, wherein the ethylene oxide constitutes 40 wt % to 99.99 wt % of the copolymer chain, or c) mixtures of polyester and said homopolymer of ethylene oxide or said copolymer chain of ethylene oxide;
  u=1 to 3;
  v=1 to 2;
  w=1 to 3
  v=2 when W=>NH;
  v=1 when W=Oxygen, Sulphur, or >NG;
  G is a hydrocarbyl group containing 1 to 200 carbon atoms; and
  Q is a fused aromatic ring containing 4n+2 π-electrons, wherein n=2 and Q is bonded to the imide group in such a way to form a 5 or 6 membered imide ring.

2. The polymer of claim 1, wherein the polymer chain is a Poly(ether) of either (i) a polyethylene oxide homopolymer, or (ii) a copolymer of ethylene oxide with either propylene oxide, butylene oxide, styrene oxide or mixtures thereof.

3. The polymer of claim 2, wherein the Poly(ether) comprises 0 to 50 wt % propylene oxide, 50 to 100 wt % ethylene oxide.

4. The polymer of claim 1 is obtained/obtainable by a process comprising:
  Step (1): reacting (i) amino acid, or (ii) an aminoalcohol, or (iii) an aminothiol, or (iv) a diamine,
    with a naphthalene di-acid or anhydride or other acid-forming derivative (such as di-ester, di-amide, acid chloride) to form an acid-functionalised naphthalene imide or an hydroxyl-functionalised naphthalene imide, or a thiol-functionalised naphthalene imide, or an amino-functionalised naphthalene imide respectively;
  Step (2): reacting the acid-functionalised naphthalene imide or the hydroxyl-functionalised naphthalene imide, or the thiol-functionalised naphthalene imide, or the amino-functionalised naphthalene imide with a polymer chain, or monomers that polymerise to form the polymer chain.

5. The polymer of claim 1, wherein the fused aromatic ring or fused aromatic di-acid or anhydride or other acid-forming derivative is based on 1,8-naphthalene imide, or 1,2-naphthalene imide or mixtures thereof.

6. The polymer of claim 1, wherein Q is based on a naphthalene anhydride selected from the group of 4-nitro-1,8-naphthalic imide (when one $R_1$=NO$_2$), 3-nitro-1,8-naphthalic imide (when one $R_1$=NO$_2$), 4-chloro-1,8-naphthalic imide (when one $R_1$=Cl), 3-sulpho-1,8-naphthalic imide (when one $R_1$=SO$_3$H), or mixtures thereof.

7. The polymer of claim 1, wherein the polymer chain is a poly(ether) represented by Formula (2):

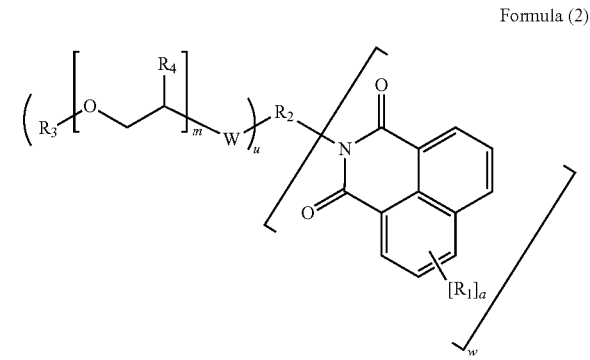

Formula (2)

wherein each variable is independently
R$_1$ is as described in claim 1;
a is 1 or 2;
W is oxygen;
R' is independently —H, or an optionally-substituted alkyl containing 1 to 20 carbon atoms, and the substituents is hydroxyl or halo, or mixtures thereof;
R$_2$ is a C$_1$ to C$_{20}$ hydrocarbylene group or a C$_1$ to C$_{20}$ hydrocarbonylene group, the hydrocarbylene group or hydrocarbonylene group is linear or branched;
R$_3$ is H or C$_{1-50}$-optionally substituted hydrocarbyl group that bonds to a terminal oxygen atom of the polymer chain forming a terminal ether or terminal ester group and may or may not contain a group capable of polymerization such as a vinyl group, or C$_{1-50}$-hydrocarbonyl group that bonds to the oxygen atom of the polymer chain forming a terminal ester group or terminal urethane group and may or may not contain a group capable of polymerization such as a vinyl group, and the substituent is halo, ether, ester, or mixtures thereof;
R$_4$ is H when Pol is a homopolymer, and R$_4$ is a mixture of H, in an amount sufficient to provide ethylene oxide groups at 40 wt % to 99.99 wt %, and at least one of methyl, ethyl and phenyl, when Pol is a copolymer;
u is 1 to 3;
w is 1 to 3;
with the proviso that when R$_2$ is a hydrocarbylene group, u is 1 and w is 1; and
m is 1 to 110.

8. The polymer of claim 1, wherein the polymer chain is a poly(ether) polymer chain represented by Formula (3a):

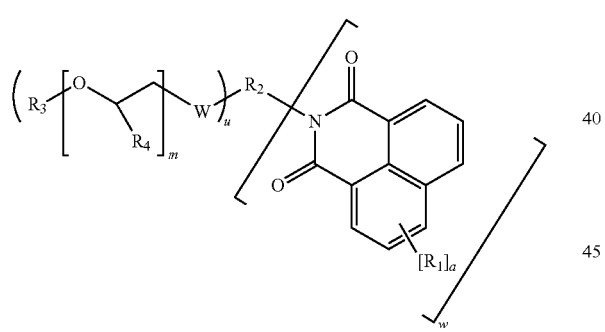

Formula (3a)

wherein each variable is independently
R$_1$ is as described in claim 1;
a is 1 or 2;
W is oxygen, sulphur, or >NG;
R' is independently —H, or an optionally-substituted alkyl, typically, containing 1 to 20 carbon atoms, and the substituents is hydroxyl or halogen, or mixtures thereof;
R$_2$ is a C$_1$ to C$_{20}$ hydrocarbylene group or a C$_1$ to C$_{20}$ hydrocarbonylene group, the hydrocarbylene group or hydrocarbonylene group is linear or branched;
G is a hydrocarbyl group containing 1 to 200 carbon atoms;
R$_3$ is H or C$_{1-50}$-optionally substituted hydrocarbyl group that bonds to a terminal oxygen atom of the polymer chain forming a terminal ether or terminal ester group and may or may not contain a group capable of polymerization such as a vinyl group, or C$_{1-50}$-hydrocarbonyl group that bonds to the oxygen atom of the polymer chain forming a terminal ester group or terminal urethane group and may or may not contain a group capable of polymerization such as a vinyl group, and the substituent is halo, ether, ester, or mixtures thereof;
R$_4$ is H when Pol is a homopolymer, and R$_4$ is a mixture of H, in an amount sufficient to provide ethylene oxide groups at 40 wt % to 99.99 wt %, and at least one of methyl, ethyl and phenyl, when Pol is a copolymer;
u is 1 to 3;
w is 1 to 3; and
m is 1 to 110.

9. The polymer of claim 1, wherein the polymer chain is a poly(ether) polymer chain represented by Formula (3b):

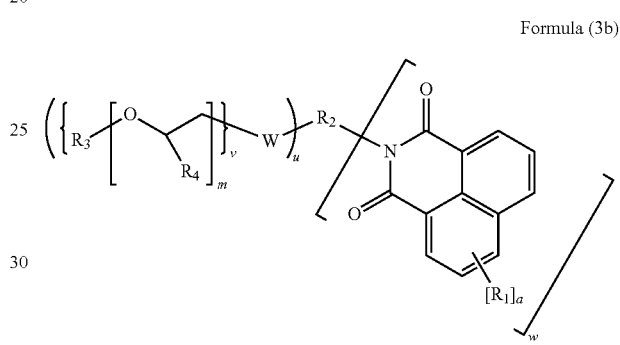

Formula (3b)

wherein each variable is independently
R$_1$ is as described in claim 1;
a is 1 or 2;
W is nitrogen;
R' is independently —H, or an optionally-substituted alkyl, typically, containing 1 to 20 carbon atoms, and the substituents is hydroxyl or halo, or mixtures thereof;
R$_2$ is a C$_1$ to C$_{20}$ hydrocarbylene group or a C$_1$ to C$_{20}$ hydrocarbonylene group, the hydrocarbylene group or hydrocarbonylene group is linear or branched;
R$_3$ is H or C$_{1-50}$-hydrocarbonyl group that bonds to the oxygen atom of the polymer chain forming a terminal ester group or terminal urethane group and may or may not contain a group capable of polymerization such as a vinyl group, and the substituent is halo, ether, ester, or mixtures thereof;
R$_4$ is H when Pol is a homopolymer, and R$_4$ is a mixture of H, in an amount sufficient to provide ethylene oxide groups at 40 wt % to 99.99 wt %, and at least one of methyl, ethyl and phenyl, when Pol is a copolymer;
u is 1 to 3;
w is 1 to 3;
v is 2; and
m is 1 to 110.

10. The polymer of claim 1, wherein the polymer chain is a poly(ether) co-poly(ester) polymer chain represented by Formula (4a):

Formula (4a)

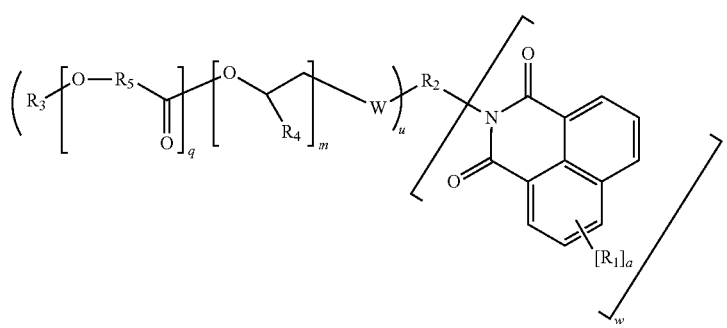

wherein each variable is independently
  $R_1$ is as described in claim 1;
  a is 1 or 2;
  W is oxygen, sulphur, or >NG;
  $R_2$ is a $C_1$ to $C_{20}$ hydrocarbylene group or a $C_1$ to $C_{20}$ hydrocarbonylene group, the hydrocarbylene group or hydrocarbonylene group is linear or branched;
  G is a hydrocarbyl group containing 1 to 200 carbon atoms;
  $R_3$ is H or $C_{1-50}$-hydrocarbonyl group that bonds to the oxygen atom of the polymer chain forming a terminal ester group or terminal urethane group and may or may not contain a group capable of polymerization such as a vinyl group, and the substituent is halo, ether, ester, or mixtures thereof;
  $R_4$ is H when Pol is a homopolymer, and $R_4$ is a mixture of H, in an amount sufficient to provide ethylene oxide groups at 40 wt % to 99.99 wt %, and at least one of methyl, ethyl and phenyl, when Pol is a copolymer;
  $R_5$ is a $C_{1-19}$-hydrocarbylene group;
  u is 1 to 3;
  w is 1 to 3;
  q is 1 to 90; and
  m is 1 to 90, with proviso that m is equal to or greater than q.

11. The polymer of claim 1, wherein the polymer chain is a poly(ether) co-poly(ester) polymer chain represented by Formula (4b):

wherein each variable is independently
  $R_1$ is as described in claim 1;
  a is 1 or 2;
  W is nitrogen;
  R' is independently —H, or an optionally-substituted alkyl containing 1 to 20 carbon atoms, and the substituents is hydroxyl or halo or mixtures thereof;
  $R_2$ is a $C_1$ to $C_{20}$ hydrocarbylene group or a $C_1$ to $C_{20}$ hydrocarbonylene group, the hydrocarbylene group or hydrocarbonylene group is linear or branched);
  $R_3$ is H or $C_{1-50}$-hydrocarbonyl group that bonds to the oxygen atom of the polymer chain forming a terminal ester group or terminal urethane group and may or may not contain a group capable of polymerization such as a vinyl group, and the substituent is halo, ether, ester, or mixtures thereof;
  $R_4$ is H when Pol is a homopolymer, and $R_4$ is a mixture of H, in an amount sufficient to provide ethylene oxide groups at 40 wt % to 99.99 wt %, and at least one of methyl, ethyl and phenyl, when Pol is a copolymer;
  $R_5$ is a $C_{1-19}$-hydrocarbylene group;
  u is 1 to 3;
  w is 1 to 3;
  v is 2;
  q is 1 to 90; and
  m is 1 to 90, with proviso that m is equal to or greater than q.

12. The polymer of claim 1, wherein the polymer chain is represented by Formula (5):

Formula (4b)

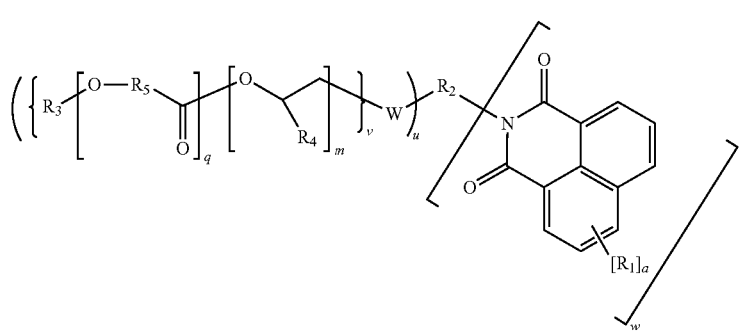

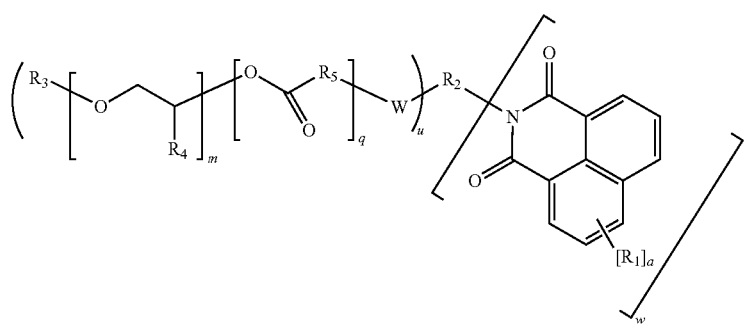

Formula (5)

wherein each variable is independently
- $R_1$ is as defined in claim 1;
- a is 1 or 2;
- W is oxygen;
- $R_2$ is a $C_1$ to $C_{20}$ hydrocarbonylene group, the hydrocarbonylene group is linear or branched;
- $R_3$ is H or $C_{1-50}$-optionally substituted hydrocarbyl group that bonds to a terminal oxygen atom of the polymer chain forming a terminal ether or terminal ester group and may or may not contain a group capable of polymerization such as a vinyl group, or $C_{1-50}$-hydrocarbonyl group that bonds to the oxygen atom of the polymer chain forming a terminal ester group or terminal urethane group and may or may not contain a group capable of polymerization such as a vinyl group, and the substituent is halo, ether, ester, or mixtures thereof;
- $R_4$ is H when Pol is a homopolymer, and $R_4$ is a mixture of in an amount sufficient to provide ethylene oxide groups at 40 wt % to 99.99 wt and at least one of methyl, ethyl and phenyl, when Pol is a copolymer;
- $R_5$ is a $C_{1-19}$-hydrocarbylene group;
- u is 1 to 3;
- w is 1 to 3;
- q is 1 to 90; and
- m is 1 to 90, with the proviso that m is equal to or greater than q.

13. The polymer of claim 1, wherein the electron withdrawing group is —Cl or —NO$_2$ or —SO$_3$M, wherein M is H, a metal cation, —NR'$_4^+$, or mixtures thereof.

14. A composition comprising a particulate solid, an aqueous medium, and a polymer chain having at least one fused aromatic imide pendant group, wherein the polymer is represented by a polymer of claim 1 and is used as a dispersant.

15. The composition of claim 14, wherein the composition is a millbase, paint or ink.

16. The composition of claim 14, wherein the particulate solid is a pigment or a filler.

17. The composition of claim 14, further comprising a binder.

18. The composition of claim 14, wherein the polymer is present in an amount ranging from 0.5 wt % to 30 wt % of the composition.

19. The polymer of claim 7, which is obtained by a process comprising:
reacting a polyetheramine with a fused naphthalene diacid or anhydride to form the polymer of formula 2.

* * * * *